US011966222B2

(12) United States Patent
VanKampen et al.

(10) Patent No.: US 11,966,222 B2
(45) Date of Patent: Apr. 23, 2024

(54) AUTONOMOUS FLOOR CLEANER AND METHOD FOR AUTONOMOUS FLOOR CLEANING

(71) Applicant: BISSELL Inc., Grand Rapids, MI (US)

(72) Inventors: David VanKampen, Grand Rapids, MI (US); Sherman Rolf Couch, West Chester, OH (US); Jared Thomas, West Olive, MI (US)

(73) Assignee: BISSELL Inc., Grand Rapids, MI (US)

( * ) Notice: Subject to any disclaimer, the term of this patent is extended or adjusted under 35 U.S.C. 154(b) by 551 days.

(21) Appl. No.: 17/145,608

(22) Filed: Jan. 11, 2021

(65) Prior Publication Data

US 2021/0216070 A1 Jul. 15, 2021

Related U.S. Application Data

(60) Provisional application No. 62/959,259, filed on Jan. 10, 2020.

(51) Int. Cl.
*G05D 1/00* (2024.01)
*G05D 1/639* (2024.01)

(52) U.S. Cl.
CPC ......... *G05D 1/0088* (2013.01); *G05D 1/0212* (2013.01); *G05D 1/639* (2024.01); *A47L 2201/04* (2013.01); *G05D 1/0272* (2013.01)

(58) Field of Classification Search
CPC .. G05D 1/0088; G05D 1/0212; G05D 1/0272; G05D 2201/0215; A47L 2201/04
See application file for complete search history.

(56) References Cited

U.S. PATENT DOCUMENTS

| | | | |
|---|---|---|---|
| 5,001,635 A | 3/1991 | Yasutomi | |
| 5,006,988 A | 4/1991 | Borenstein et al. | |
| 5,319,611 A | 6/1994 | Korba | |
| 5,684,695 A | 11/1997 | Bauer | |
| 8,996,292 B2* | 3/2015 | Park | G09B 29/00 701/25 |
| 11,199,853 B1* | 12/2021 | Afrouzi | G05D 1/0246 |
| 2017/0332862 A1* | 11/2017 | Jun | G05D 1/0274 |
| 2018/0020893 A1* | 1/2018 | Lee | A47L 5/22 701/28 |
| 2018/0078106 A1 | 3/2018 | Scholten et al. | |
| 2018/0140155 A1* | 5/2018 | Mitchell | G05D 1/0242 |
| 2018/0289225 A1* | 10/2018 | Izawa | A47L 9/28 |
| 2019/0258262 A1 | 8/2019 | Vicenti | |
| 2020/0329937 A1* | 10/2020 | Sheikh | G05D 1/0274 |

FOREIGN PATENT DOCUMENTS

EP 3257420 A1 12/2017
KR 20190134969 A 12/2019

* cited by examiner

*Primary Examiner* — Ryan Rink
(74) *Attorney, Agent, or Firm* — Warner Norcross + Judd LLP

(57) ABSTRACT

An autonomous floor cleaner includes multiple occupiable space sensors for position and/or proximity sensing. Data from the occupiable space sensors can be used determine areas of occupiable space in proximity to the autonomous floor cleaner. Methods for exiting a trapped condition, obstacle avoidance, and path planning are disclosed.

22 Claims, 13 Drawing Sheets

AUTONOMOUS FLOOR CLEANER AND METHOD FOR AUTONOMOUS FLOOR CLEANING

CROSS-REFERENCE TO RELATED APPLICATION(S)

The present application claims the benefit of U.S. Provisional Patent Application No. 62/959,259, filed Jan. 10, 2020, which is incorporated herein by reference in its entirety.

BACKGROUND

Autonomous or robotic floor cleaners can move without the assistance of a user or operator to clean a floor surface. For example, the floor cleaner can be configured to vacuum or sweep dirt (including dust, hair, and other debris) into a collection bin carried on the floor cleaner. Some floor cleaners are further configured to apply and extract liquid for wet cleaning of bare floors, carpets, rugs, and other floor surfaces. The floor cleaner can move randomly about a surface while cleaning the floor surface or use a mapping/navigation system for guided navigation about the surface.

One noted problem with current autonomous floor cleaners is the tendency to become trapped within small areas, due to obstacle density, size, and orientation with regards to each other. Examples of small areas in which such floor cleaners commonly become trapped include under tables, between chair legs, or in corners of rooms where furniture, side tables, etc. are pushed up against the walls. These obstacle conditions are particularly problematic for a random-driving autonomous floor cleaner, which tend to get stuck in these small areas, bouncing frequently off obstacles, wasting battery life, and not cleaning new floor areas.

BRIEF SUMMARY

In one aspect, the disclosure relates to an autonomous floor cleaner.

In one embodiment, the autonomous floor cleaner includes an autonomously moveable housing, a drive system for autonomously moving the housing over the surface to be cleaned, a controller for controlling the operation of the autonomous floor cleaner, and one or more sensors for determining areas of occupiable space.

In certain embodiments, the controller is configured to drive the autonomous floor cleaner in a zero-radius turn, analyze input from the plurality of occupiable space sensors to determine at least one area of occupiable space around the autonomous floor cleaner, select a heading for the autonomous floor cleaner based on the determination of at least one area of occupiable space around the autonomous floor cleaner, and operate the drive system to drive the autonomous floor cleaner forwardly on the heading.

In another aspect, various methods for exiting a trapped condition for an autonomous floor cleaner are described herein.

In one embodiment, a method for exiting a trapped condition for an autonomous floor cleaner is provided. When in a trapped condition, the autonomous floor cleaner can perform a zero-radius turn while taking readings with distance sensors. The autonomous floor cleaner can determine a heading for exiting the trapped condition based on sensor readings from the zero-radius turn.

In another embodiment, a method for exiting a trapped condition includes detecting a trapped condition, driving the autonomous floor cleaner in a zero-radius turn, detecting occupiable space around the autonomous floor cleaner, wherein occupiable space comprises an area large enough to drive the autonomous floor cleaner through, and driving the autonomous floor cleaner out of the trap.

In yet another aspect, various methods for obstacle avoidance for an autonomous floor cleaner are described herein. In one embodiment, a method for obstacle avoidance includes performing a zero-radius turn while taking readings with distance sensors. The autonomous floor cleaner can determine a heading for avoiding obstacles based on sensor readings from the zero-radius turn.

In still another aspect, various methods for path planning for an autonomous floor cleaner are provided. In one embodiment, a method of planning a cleaning path includes performing a zero-radius turn while taking readings with distance sensors. The autonomous floor cleaner can determine a heading for the cleaning path based on sensor readings from the zero-radius turn.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

The disclosure generally relates to autonomous floor cleaners and methods for autonomous floor cleaning More specifically, in one aspect the disclosure relates to systems and methods for exiting trapped conditions for an autonomous floor cleaner. In another aspect, the disclosure relates to systems and methods for obstacle avoidance for an autonomous floor cleaner. In another aspect, the disclosure relates to systems and methods for path planning for an autonomous floor cleaner.

Figure 1:
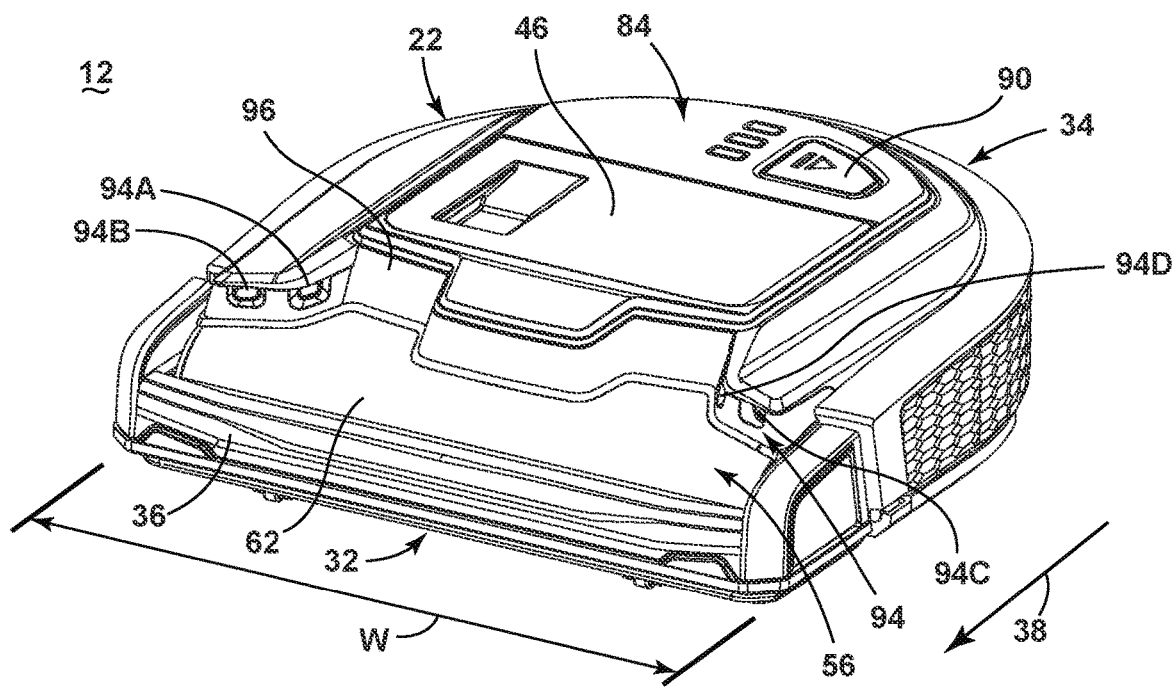
FIG. 1 is a perspective view of an autonomous floor cleaner or robot according to one embodiment of the invention.
Figure 2:
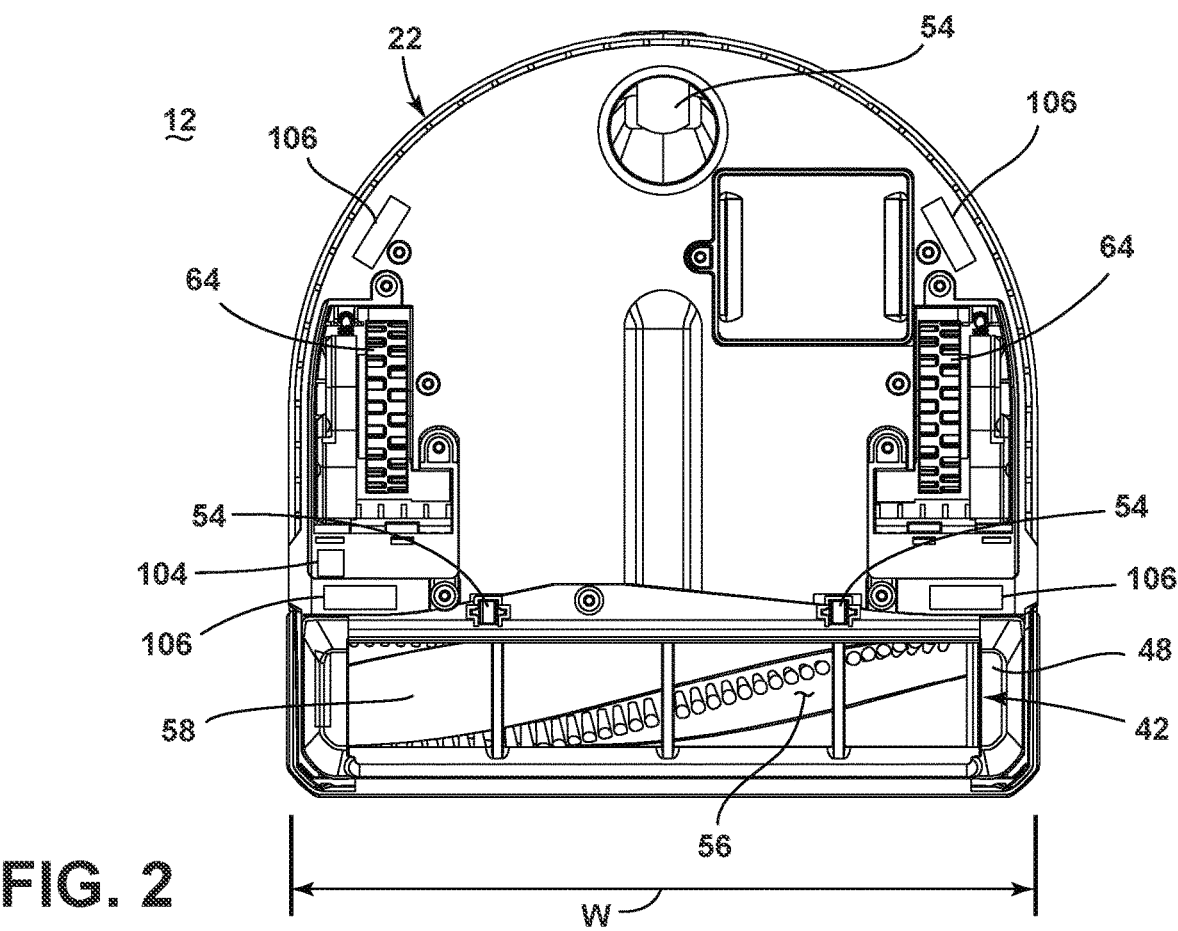
FIG. 2 is a bottom view of the robot from FIG. 1.
Figure 3:
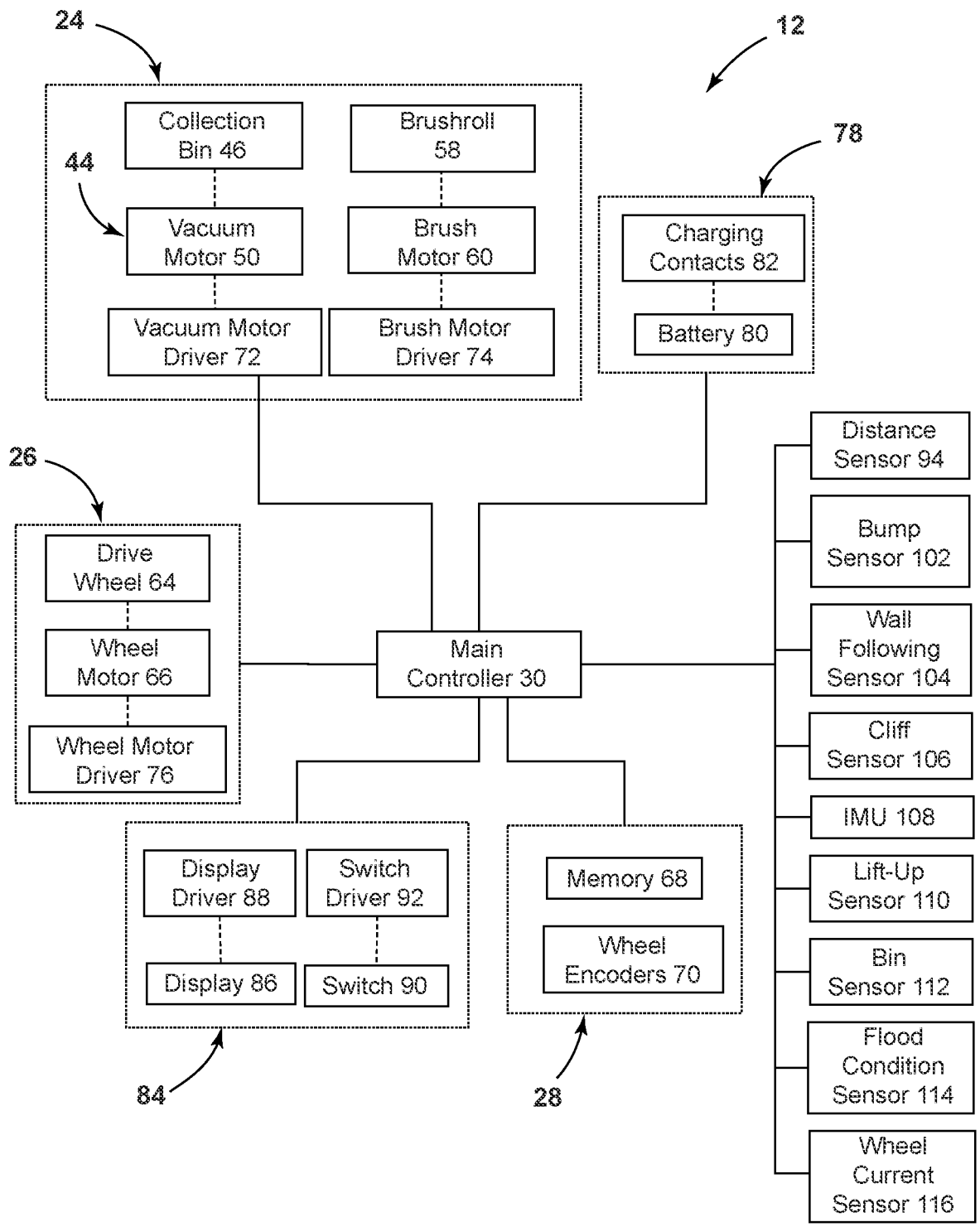
FIG. 3 is a schematic view of the robot from FIG. 1.

FIGS. 1-3 illustrate one embodiment of an autonomous floor cleaner according to one embodiment of the invention. The autonomous floor cleaner 12, also referred to herein as robot 12, can clean various floor surfaces, including bare floors such as hardwood, tile and stone, and soft surfaces such as carpets and rugs. The robot 12 includes multiple on-board sensors and can determine areas of occupiable space, or open areas. As used herein, the term "occupiable space" means a space large enough for the robot 12 to drive through, unless otherwise indicated. A space large enough for the robot to drive through can be a space greater than the widest dimension of the robot 12 orthogonal to the direction of forward movement (e.g. arrow 38 in FIG. 1). For a D-shaped robot 12 as shown, a space large enough for the robot 12 to drive through can be a space greater that than the width of the front of the robot 12. For a circular robot, a space large enough for the robot to drive through can be a space greater that than the diameter of the robot. It is noted that the robot 12 shown in FIGS. 1-3 is but one example of an autonomous floor cleaner that includes the on-board sensors for determining areas of occupiable space, and can perform the methods described herein, and that other autonomous floor cleaners can be used.

In one embodiment, the robot 12 can be a dry vacuum cleaning robot including at least a vacuum collection system for creating a partial vacuum to suck up debris (which may include dirt, dust, soil, hair, and other debris) from a floor surface, and collect the removed debris in a space provided on the robot for later disposal.

In another embodiment, the robot 12 can be a deep cleaning robot including a fluid delivery system for storing cleaning fluid and delivering the cleaning fluid to the surface to be cleaned and a fluid recovery system for removing the cleaning fluid and debris from the surface to be cleaned and storing the recovered cleaning fluid and debris. The fluid delivery system may be configured to delivery liquid, steam, mist, or vapor to the surface to be cleaned.

In yet another embodiment, the robot 12 can be a wet mopping or sweeping robot including a fluid delivery system for storing cleaning fluid and delivering the cleaning fluid to the surface to be cleaned and a mopping or sweeping system for removing cleaning fluid and debris from the surface to be cleaned without the use of suction. The fluid delivery system may be configured to delivery liquid, steam, mist, or vapor to the surface to be cleaned.

In still another embodiment, the robot 12 can be a dry sweeping robot including a sweeping system for removing dry debris from the surface to be cleaned without the use of suction, and collect the removed debris in a space provided on the robot for later disposal.

Optionally, a docking station (not shown) can be provided for recharging a power supply of the robot 12, and/or an artificial barrier system (not shown) can be provided for containing the robot 12 within a user-determined boundary.

The robot 12 mounts the components various functional systems of the autonomous floor cleaner in an autonomously moveable unit or housing 22, including components of a vacuum collection system 24 for generating a working air flow for removing dirt (including dust, hair, and other debris) from the surface to be cleaned and storing the dirt in a collection space on the vacuum cleaner, a drive system 26 for autonomously moving the robot 12 over the surface to be cleaned, and a navigation/mapping system 28 for guiding the movement of the robot 12 over the surface to be cleaned, generating and storing maps of the surface to be cleaned, and recording status or other environmental variable information.

A controller 30 is operably coupled with the various functional systems 24, 26, 28 of the robot 12 for controlling the operation of the robot 12. The controller 30 can be a microcontroller unit (MCU) that contains at least one central processing unit (CPU).

As shown, the housing 22 of the robot 12 can be a D-shaped, with a first end 32 and a second end 34. The first end 32 defines the front of the robot 12 and can be a straightedge portion of the D-shaped housing 22, optionally comprising a bumper 36. The second end 34 can define the rear of the robot 12 and can be a rounded portion of the D-shaped housing 22. Other shapes and configurations for the robot 12 are possible, including that the rounded portion of the D-shaped housing 22 can define the front of the robot 12 and the straightedge portion of the D-shaped housing 22 can define the rear of the robot 12.

Forward motion of the robot 12 is illustrated with an arrow 38, and the bumper 36 wraps around the first end 32 of the robot 12 to cover the front of the robot 12. During a collision with an obstacle, the bumper 36 can shift or translate to register a detection of an object. The bumper 36 can also wrap around and cover a portion of each lateral side 40 of the robot 12, and may optionally be adapted for a dual-direction movement to sense obstacles in front of and on the sides of the robot 12. The lateral sides 40 of the robot 12 extend between the first end 32 and the second end 34 of the robot 12.

The first end 32 of the robot 12 can define a widest dimension W of the robot 12 orthogonal to the direction of forward movement indicated by arrow 38. Thus, for the robot 12 shown, an occupiable space is a space that is greater than the width W of the first end 32 of the robot 12. The width W of the first end 32 can be the distance between the lateral sides 40 of the robot 12, and can optionally be the width of the bumper 36 in embodiments where the bumper 36 wraps around and covers a portion of each lateral side 40.

The vacuum collection system 24 can include a working air path through the unit having an air inlet and an air outlet, a suction nozzle 42, a suction source 44 in fluid communication with the suction nozzle 42 for generating a working air stream, and a collection bin 46 for collecting dirt from the working airstream for later disposal. The suction nozzle 42 can define the air inlet of the working air path, with the inlet opening of the suction nozzle 42 provided on an underside 48 of the housing 22 and facing a surface to be cleaned. The suction source 44 can include a vacuum motor 50 carried by the housing 22, fluidly upstream of the air outlet (not shown), and can define a portion of the working air path. The collection bin 46 can also define a portion of the working air path, and comprise a dirt bin inlet (not shown) in fluid communication with the suction nozzle 42. Optionally, a separator (not shown) can be formed in a portion of collection bin 46 for separating fluid and entrained dirt from the working airstream. Some non-limiting examples of separators include a cyclone separator, a filter screen, a foam filter, a HEPA filter, a filter bag, or combinations thereof. In one embodiment, the robot 12 includes a cyclonic separation system that is driven by a brushless vacuum motor 50. Optionally, a pre-motor filter and/or a post-motor filter (not shown) can be provided in the working air path as well. The working air path can further include various conduits, ducts, or tubes for fluid communication between the various components of the vacuum collection system 24. The vacuum motor 50 can be positioned fluidly downstream or fluidly upstream of the collection bin 46 in the working air path.

The robot 12 can include a brush chamber 56 at the front of the housing 22 in which a brushroll 58 is mounted. The brushroll 58 is mounted for rotation about a substantially horizontal axis, relative to the surface over which the robot 12 moves. A drive assembly including a brush motor 60 can be provided within the robot 12 to drive the brushroll 58. In other embodiments, other configurations of agitators or brushrolls can be provided, including one or more stationary or non-moving brushes, or one or more brushes that rotate about a substantially vertical axis.

In the present embodiment, the brushroll 58 is mounted at the front of the robot 12, with the brushroll 58 generally parallel to the first end 32. The brushroll 58 can by at least partially enclosed by a transparent window 62 at the front of the housing 22.

The drive system 26 can include drive wheels 64 for driving the robot 12 across a surface to be cleaned. The drive wheels 64 can be operated by a common wheel motor 66 or individual wheel motors 66 coupled with the drive wheels 64 by a transmission, which may include a gear train assembly or another suitable transmission. The drive system 26 can receive inputs from the controller 30 for driving the robot 12 across a floor, based on inputs from the navigation/mapping system 28 for the autonomous mode of operation or based on inputs from a smartphone, tablet, or other remote device for an optional manual mode of operation. The drive wheels 64 can be driven in a forward or reverse direction to move the unit forwardly or rearwardly. Furthermore, the drive wheels 64 can be operated simultaneously at the same rotational speed for linear motion or independently at different rotational speeds to turn the robot 12 in a desired direction. While the drive system 26 is shown herein as including rotating wheels 64, it is understood that the drive system 26 can comprise alternative traction devices for moving the robot 12 across a surface to be cleaned.

In addition to the drive wheels 64 or other traction devices, the robot 12 can include one or more additional wheels 54 which support the housing 22, such as a castor wheel at a center, rear portion of the underside 48 of the housing 22, and a pair of wheels adjacent a rear edge of the opening defining the suction nozzle 42.

The controller 30 can receive input from the navigation/mapping system 28 or from a remote device such as a smartphone (not shown) for directing the robot 12 over the surface to be cleaned. The navigation/mapping system 28 can include a memory 68 that can store any data useful for navigation, mapping or conducting a cycle of operation, including, but not limited to, maps for navigation, inputs from various sensors that are used to guide the movement of the robot 12, etc. For example, wheel encoders 70 can be placed on the drive shafts of the drive wheels 64 and configured to measure a distance traveled by the robot 12. The distance measurement can be provided as input to the controller 30.

In an autonomous mode of operation, the robot 12 can be configured to travel in any pattern useful for cleaning or sanitizing including a cornrow pattern, e.g. boustrophedon or alternating rows (that is, the robot 12 travels from right-to-left and left-to-right on alternate rows), spiral trajectories, etc., while cleaning the floor surface, using input from various sensors to change direction or adjust its course as needed to avoid obstacles. In the optional manual mode of operation, movement of the robot 12 can be controlled using a mobile device such as a smartphone or tablet.

The robot 12 can include any number of motors useful for performing locomotion and cleaning. In one example, three dedicated motors 50, 60, 66, can respectively be provided to generate a partial vacuum at the suction nozzle 4, rotate the brushroll 58, and drive the wheels 64 In another example, these locomotion and cleaning operations are performed by less than three or more than three motors.

The robot 12 can include any number of motor drivers for controlling the motors 50, 60, 66. In the embodiment shown, a vacuum motor driver 72, a brush motor driver 74, and a wheel motor driver 76 can be provided for controlling the vacuum motor 50, brush motor 60, and wheel motors 66, respectively. The motor drivers 72-76 can act as an interface between the controller 30 and their respective motors. The motor drivers 72-76 can also be an integrated circuit chip (IC).

The motor drivers 72-76 can be electrically coupled to a battery management system 78 that includes a rechargeable battery 80, which may comprise battery pack. In one example, the battery pack can comprise a plurality of can include lithium ion batteries. Batteries with other cell chemistries, such as nickel metal hydride and nickel cadmium, are also possible. Charging contacts 82 for the battery 80 can be provided on an exterior surface of the robot 12. A docking station (not shown) for recharging the battery 80 can be provided with corresponding charging contacts. In one example, the docking station can be connected to a household power supply, such as an A/C power outlet, and can include a converter for converting the AC voltage into DC voltage for recharging the battery 80 on-board the robot 12.

The controller 30 is further operably coupled with a user interface (UI) 84 on the robot 12 for receiving inputs from a user. The UI 84 can be used to select an operation cycle for the robot 12 or otherwise control the operation of the robot 12. The UI 84 can have a display 86, such as an LED display, for providing visual notifications to the user. A display driver 88 can be provided for controlling the display 86, and acts as an interface between the controller 30 and the display 86. The display driver 88 may be an IC. The robot 12 can be provided with a speaker (not shown) for providing audible notifications to the user.

In one embodiment, the display 86 can comprise a full on-device LED scrolling display for notifications.

The UI 84 can further have one or more switches 90 that are actuated by the user to provide input to the controller 30 to control the operation of various components of the robot 12. A switch driver 92 can be provided for controlling the switch 90, and acts as an interface between the controller 30 and the switch 90.

The robot 12 can comprise an on-board Wi-Fi connection that is configured to allow the robot 12 to be controlled remotely through a mobile device, such as a smartphone or tablet, or via a voice-controlled remote device such as an Amazon Echo® or Amazon Echo Dot® having the Amazon Alexa® cloud-based voice service, or a Google Home® or Google Home Mini® having Google Assistant. For example, a user with a smart speaker device can speak an instruction, such as "Alexa, ask [robot] to start cleaning," and via the Wi-Fi and/or Internet connectivity, the robot 12 can begin a cleaning cycle of operation.

A smart device application for the robot 12 that is executed on a mobile or remote device can include further command and control features including, but not limited to, scheduling features to enable a user to select when the robot 12 will conduct cleaning. Other features of the smart device application cam include a display of the robot's cleaning history, a landing page with current blogs and support videos related to the robot 12, and controls to automatically reorder accessories for the robot 12 when needed. The smart device application can also be configured to provide detailed notifications relating diagnostics, error warnings, and other information directly to the user.

The robot 12 can be provided with one or more cameras or stereo cameras (not shown) for acquiring visible notifications from the user. In this way, the user can communicate instructions to the robot 12 by gestures. For example, the user can wave their hand in front of the camera to instruct the robot 12 to stop or move away.

Figure 4:
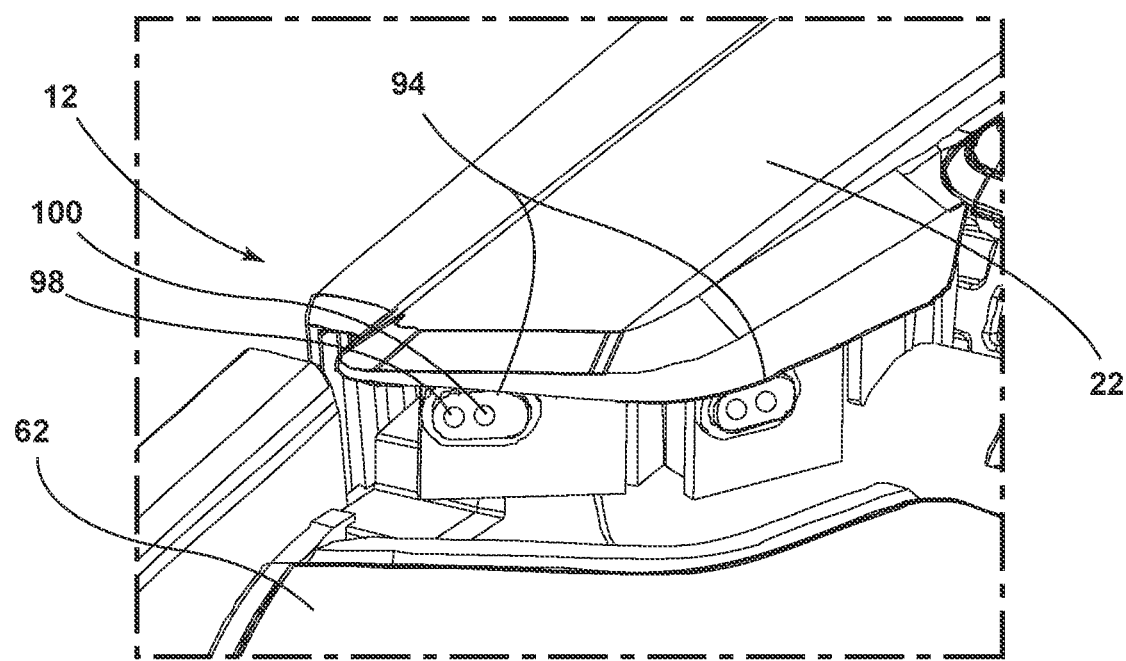
FIG. 4 is an enlarged view of portion of the robot with a sensor cover removed, showing one embodiment of a distance sensor for the robot.

The controller 30 can be operably coupled with various sensors on board the robot 12 for receiving input about the environment or about the robot 12, and can use the sensor input to control the operation of the robot 12, as described in further detail below. In one embodiment, sensor data can be used by the controller 30 to determine occupiable space around the robot 12. Some sensors may detect features of the surrounding environment of the robot 12 including, but not limited to, walls, floors, furniture, pets, stairs, ledges, etc. The sensor input can further be stored in the memory 68 or used to develop maps by the navigation/mapping system 28. Some exemplary sensors are illustrated in FIG. 4, and described below. Although it is understood that not all sensors shown may be provided, additional sensors may be provided, and that all of the possible sensors can be provided in any combination.

The robot 12 can include one or more distance sensor(s) 94 for position/proximity sensing. The distance sensor(s) 94 can be infrared sensors or time-of-flight (TOF) sensors. Each distance sensor 94 has a field of view, or sensing zone, which can optionally overlap each other, to detect obstacles towards the front and sides of the robot 12. Input from the distance sensors 94 is used by the controller 30 to slow down and/or adjust the course of the robot 12 when objects are detected by the sensors 94.

In one embodiment, input from the distance sensors 94 is used by the controller 30 to determine areas of occupiable space around the robot 12. Data from the sensors 94 can be used to determine a precise distance to objects in proximity to the robot 12, and can be used to determine the absence of objects in proximity to the robot 12 and/or the distance between objects in proximity to the robot 12. For example, if two adjacent objects in proximity to the robot 12 are spaced apart by a distance greater than the widest dimension W of the robot 12 orthogonal to the direction of forward movement 38, the controller 30 can identify this area as an occupiable space. The robot 12 can use a determination of occupiable space to exit a trapped condition, avoid obstacles, and/or plan a cleaning path.

In the embodiment illustrated, four distance sensors 94 are provided, two near each lateral side of the housing 22. The sensors 94 include an inboard right-side sensor 94A, an outboard right-side sensor 94B, an outboard left-side sensor 94C, and an inboard left-side sensor 94D. Other numbers and locations for the distance sensors 94 are possible.

The sensors 94 are mounted to the housing 22, above the window 62, and behind a transparent or translucent portion of the housing 22. For example, the housing 22 can comprise a transparent or translucent sensor cover 96 for covering and protecting the sensors 94, while also admitting a light signal therethrough. The sensor cover 96 can comprise a single, continuous sensor cover or include individual lens inserts for each distance sensor 94.

Referring to FIG. 4, a portion of the robot 12 with the sensor cover 96 removed is shown. In the embodiment shown herein, each distance sensor 94 is a TOF sensor, and can have an emitter 98 and a receiver 100. The TOF sensors 94 measure the time it takes for a light signal to travel from the emitter 98 to the receiver 100 for determining a precise distance to objects in proximity to the robot 12. The emitter 98 emits a pulsed light signal and can comprise an LED emitting the light signal. In one embodiment, the LED can be an infrared LED emitting an infrared light beam.

In the illustrated embodiment, the emitter 98 and receiver 100 have a round shape and are mounted behind separate circular holes. Thus, both the emitter 98 and receiver 100 have a conical field of view, or sensing zone, and thus the TOF sensor 94 also has a conical field of view, or sensing zone. The TOF sensors 94 can be oriented at varying angles near the front or first end 32 of the robot 12. The varying angles may preferably each be a different angle that allows a field of view, or sensing zone, in both a forward and a side direction for each sensor 94. Such a field of view allows each sensor 94 to detect obstacles towards the front and sides of the autonomous robot 12.

The TOF sensors 94 can be staggered relative to the front and sides of the robot 12 so that the robot 12 can accurately determine when obstacles have been cleared. In the illustrated embodiment, there are two sensors 94 on the left and right sides of the robot 12, where the left and right sides are defined relative to the first end 32. The sensors 94 closer to the first end 32 are leading sensors 94 and the sensors further from the first end 32 are trailing sensors 94.

Figure 5:
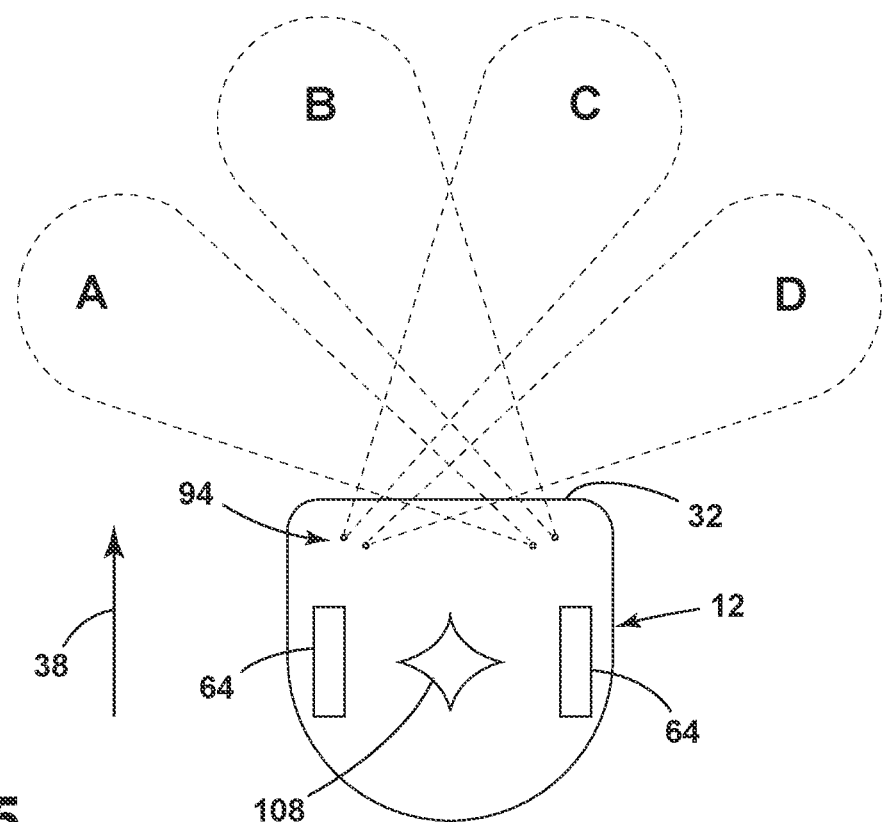
FIG. 5 is a top schematic view of the robot, showing multiple distance sensors in one exemplary layout and a coverage pattern provided by the distance sensors.
Figure 6:
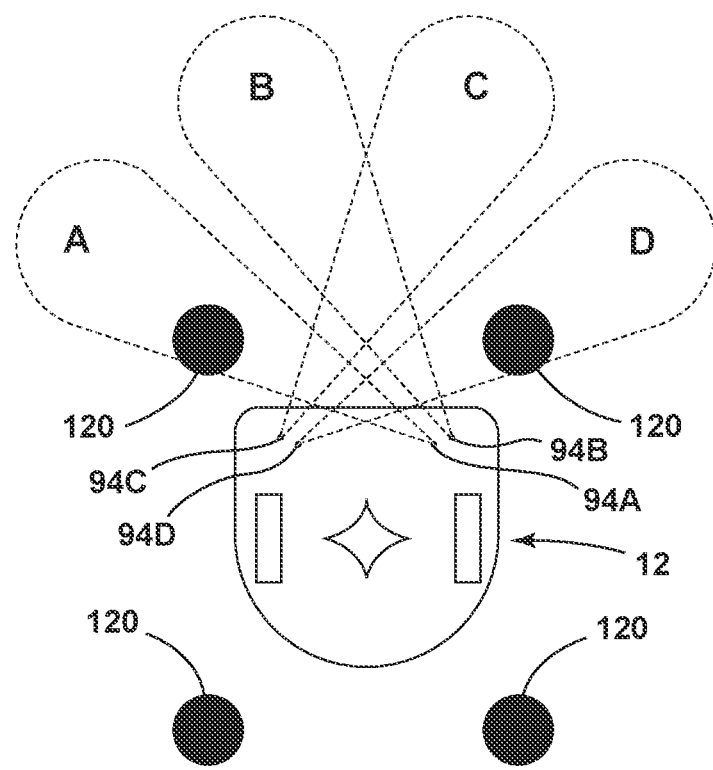
FIGS. 6-9 are schematic illustrations showing the robot in a trapped condition between a plurality of obstacles, and depicting a method of exiting the trapped condition, according to one embodiment of the invention.

FIG. 5 illustrates one embodiment of a coverage pattern provided by the TOF sensors 94 of the robot 12. The TOF sensors 94 on the left and right sides of the robot 12 can be oriented to provide overlapping fields of view A, B, C, D. As the robot 12 travels over a floor surface, the field of view or sensing zone in which an object is sensed can change. This allows the robot 12 to accurately and precisely determine the fore/aft and lateral position of an object in proximity to the housing 22, and is superior to autonomous cleaners having dedicated forward- and/or side-facing sensors.

In the embodiment shown, the inboard right-side sensor 94A has a field of view A, the outboard right-side sensor 94B has a field of view B, the outboard left-side sensor 94C has a field of view C, and the inboard left-side sensor 94D has a field of view D. The outboard sensors 94B, 94C closer to the first end 32 are leading sensors and provide the furthest coverage via their respective fields of view B, C. The inboard sensors 94A, 94D further from the first end 32 are trailing sensors and can provide greater lateral coverage via their respective fields of view A, D. The fields of view A, B, C, D can be configured to overlap, creating zones of multiple sensor coverage.

In the illustrated embodiment, the orientation of the TOF sensors 94 provides a total field of view that extends across the entire first end 32 of the robot 12, and gets wider as the distance from the first end 32 of the robot 12 increases. The orientation of the TOF sensors 94 includes both the angle and position relative to the front and sides of the robot 12. Due to the overlapping fields of view shown in FIG. 5, the concentration of light signals emitted by the sensors 94 can be densest directly in front of the robot 12, i.e. immediately in front of the first end 32.

Returning to FIG. 4, the robot 12 may include one or more of a bump sensor 102, a wall following sensor 104, a cliff sensor 106, an inertial measurement unit (IMU) 108, a lift-up sensor 110, a bin sensor 112, a floor condition sensor 114, or wheel current sensors 116, including any combination or multiples thereof.

The bump sensor 102 determines front or side impacts to the robot 12, and may be integrated with the housing 22, such as with a bumper 36 (FIG. 2). Output signals from the bump sensors 102 provide inputs to the controller 30 for selecting an obstacle avoidance algorithm. Optionally, input from the bump sensors 102 can be used by the controller 30 to determine if the robot 12 is in a trapped condition.

The wall following sensor 104 (also known as a side wall sensor) can be located near the side of the housing 22 and can include a side-facing position sensor that provides distance feedback and controls the robot 12 so that the robot 12 can follow near a wall without contacting the wall. The wall following sensor 104 can be an optical, mechanical, or ultrasonic sensor, including a reflective or time-of-flight sensor. In another embodiment, a wall following sensor is not provided, and the TOF sensors 94 are instead used as wall following sensors. Optionally, input from the wall following sensor 104 can be used by the controller 30 to determine if the robot 12 is in a trapped condition.

The cliff sensor 106 can be a ground-facing position sensor that provides distance feedback so that the robot 12 can avoid excessive drops down stairwells, ledges, etc. The cliff sensor 106 can be an optical, mechanical, or ultrasonic sensor, including a reflective or time-of-flight sensor. In the illustrated embodiment, and as shown in FIG. 2, four cliff sensors 106 can be provided on the underside 48 of the housing 22 and facing generally downwardly. Optionally, input from the cliff sensors 106 can be used by the controller 30 to determine if the robot 12 is in a trapped condition.

The IMU 108 measures and reports the robot's acceleration, angular rate, or magnetic field surrounding the robot 12, using a combination of at least one accelerometer, gyroscope, and, optionally, magnetometer or compass. The IMU 108 can be an integrated inertial sensor located on the controller 30 and can be a nine-axis gyroscope or accelerometer to sense linear, rotational or magnetic field acceleration. The IMU 108 can use acceleration input data to calculate and communicate change in velocity and pose to the controller 30 for navigating the robot 12 around the surface to be cleaned. Optionally, as described in further detail below, input from the IMU 108 can be used to determine the robot's current pose or heading when searching for occupiable space.

The lift-up sensor 110 detects when the robot 12 is lifted off the surface to be cleaned e.g. if a user picks up the robot 12. This information is provided as an input to the controller 30, which can halt operation of the motors 50, 60, 66 in response to a detected lift-up event. The lift-up sensor 110 may also detect when the robot 12 is in contact with the surface to be cleaned, such as when the user places the robot 12 back on the ground. Upon such input, the controller 30 may resume operation.

The robot 12 can optionally include a bin sensor 112 for detecting a characteristic or status of the collection bin 46. In one example, a pressure sensor for detecting the weight of the collection bin 46 can be provided. In another example, a magnetic sensor for detecting the presence of the collection bin 46 can be provided. This information is provided as an input to the controller 30, which may prevent operation of the robot 12 until the collection bin 46 is emptied or properly installed, in non-limiting examples. The controller 30 may also direct the display 86 to provide a notification to the user that the collection bin 46 is full or missing.

The floor condition sensor 114 detects a condition of the surface to be cleaned. For example, the robot 12 can be provided with an infrared (IR) dirt sensor, a stain sensor, an odor sensor, or a wet mess sensor. The floor condition sensor 114 provides input to the controller 30 that may direct operation of the robot 12 based on the condition of the surface to be cleaned, such as by selecting or modifying a cleaning cycle. Optionally, the floor condition sensor 114 can also provide input for display on a smartphone.

The wheel current sensors 116 detect changes in motor current for the wheel motors 66, and provides feedback to the controller 30. Wheel current feedback from the wheel current sensor 116 can be used to detect wheel slip with respect to the floor surface. Optionally, increases in motor current can also indicate that the robot 12 has hit an obstacle, and the wheels 64 are generating additional load on the motors 66 while attempting to still move the robot 12 on its desired course. Wheel current sensors 116 can be provided for each wheel motor 66.

FIGS. 6-9 are schematic illustrations showing the robot 12 in a trapped condition and depicting a method of exiting the trapped condition, according to one embodiment. A trapped condition can be a condition where the robot 12 is trapped within a small area due to obstacle density, size, and orientation with regards to each other. Examples of small areas in which the robot 12 may become trapped include under tables, between chair legs, or in corners of rooms where furniture, side tables, etc. are pushed up against the walls. Using the method for exiting the trapped condition depicted in FIGS. 6-9, the robot 12 can avoid getting stuck in this trapped condition.

The controller 30 can determine that the robot 12 is trapped based on the detection of a predetermined number of obstacles within a predetermined period of time. For example, in one embodiment, the controller 30 can determine that the robot 12 is trapped if at least five obstacles are detected within a period of three seconds. Input from one or more of the distance sensors 94, bump sensors 102, wall following sensor 104, cliff sensors 106, and/or IMU 108 can be used by the controller 30 to determine whether the robot 12 is in a trapped condition. In the example shown in FIG.

6, the robot 12 is trapped between a plurality of circular obstacles 120 (e.g., the legs of a coffee table or chair).

When trapped, the robot 12 can use one or more on-board sensors, such as the distance sensors 94, to determine areas of occupiable space, or open areas, around the robot 12. To locate occupiable space, the robot 12 can perform a zero-radius turn as indicated by arrow 122 while taking readings with the distance sensors 94. Performing the zero-radius turn can comprise rotating a predetermined angle, such as rotating 360 degrees, in a clockwise or counterclockwise direction, about a center point of the robot 12, while the center point is aligned to a rotational axis having a static or fixed position during rotation of the robot 12.

In one embodiment, the robot 12 can use multiple TOF sensors 94 providing time-synchronized, or nearly time-synchronized (e.g., within 30 milliseconds of each other), readings to determine areas of occupiable space. For example, obtaining readings from two or more of the sensors 94 simultaneously provides a more accurate determination of the size and/or shape of occupiable space in proximity to the robot 12 than individual reading from just one sensor.

In certain embodiments, in addition to the TOF sensors 94, the robot 12 can use the wheel encoders 70 of the drive wheels 64 and IMU 108, to determine areas of occupiable space as a vector relative to the robot's current pose. Wheel odometry based on data from the wheel encoders 70 and IMU heading data provided by the IMU 108 can be used to control the zero-radius turn. When the robot 12 is rotating to search for occupiable space, the controller 30 correlates sensor readings to the robot's current heading, as determined based on data from the IMU 108. The controller 30 also uses readings from the wheel encoders 70 as input that the robot's position is static (i.e. that the robot is rotating about a center point). For example, during a zero-radius turn, readings from the wheel encoders 70 show that the motion each wheel 64 travels is equal in magnitude and opposite in direction. Wheel current feedback from the wheel current sensor 116 and acceleration data from the IMU 108 can also be used to control the zero-radius turn, as such data can be used to detect wheel slip. Thus, odometry and IMU data can be used to determine where the robot 12 is currently pointing, and then readings from the TOF sensors 94 can be used to determine how much open area is accessible from where the robot 12 is currently pointing.

Figure 7:
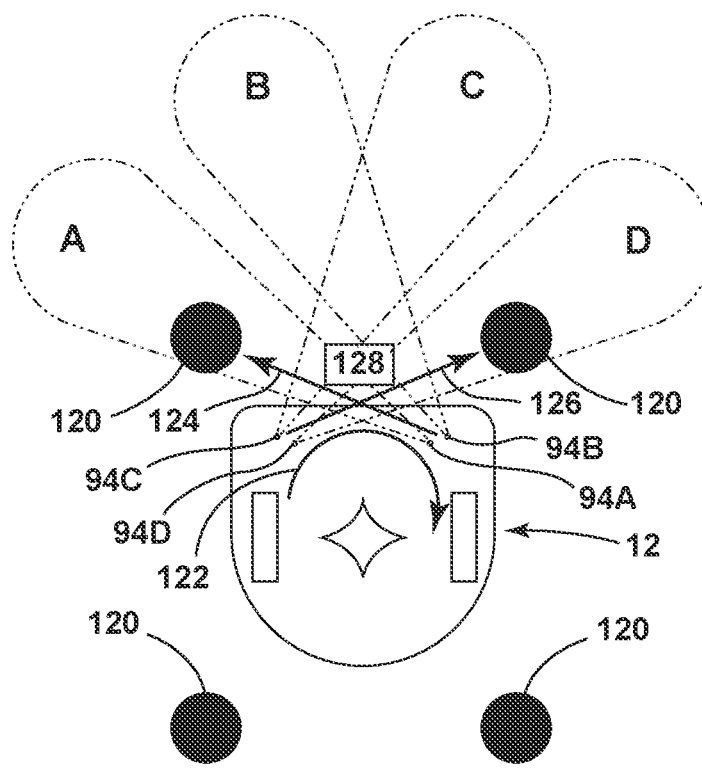

As the robot 12 performs the zero-radius turn, the robot 12 can keeps track of where open areas are located in proximity to the robot's position. FIG. 7 shows that, in this position, obstacles 120 are detected in each of the zones A and D, causing distance readings 124, 126 to be reported by the corresponding sensors 94A, 94D. Obstacles are not detected in zones B and C. The controller 30 can keep track of where open areas are, relative to the robot's current position or heading. Therefore, sensor readings show an open area 128 for zones B and C, between the two obstacles 120, at the robot's current position or heading.

Figure 8:
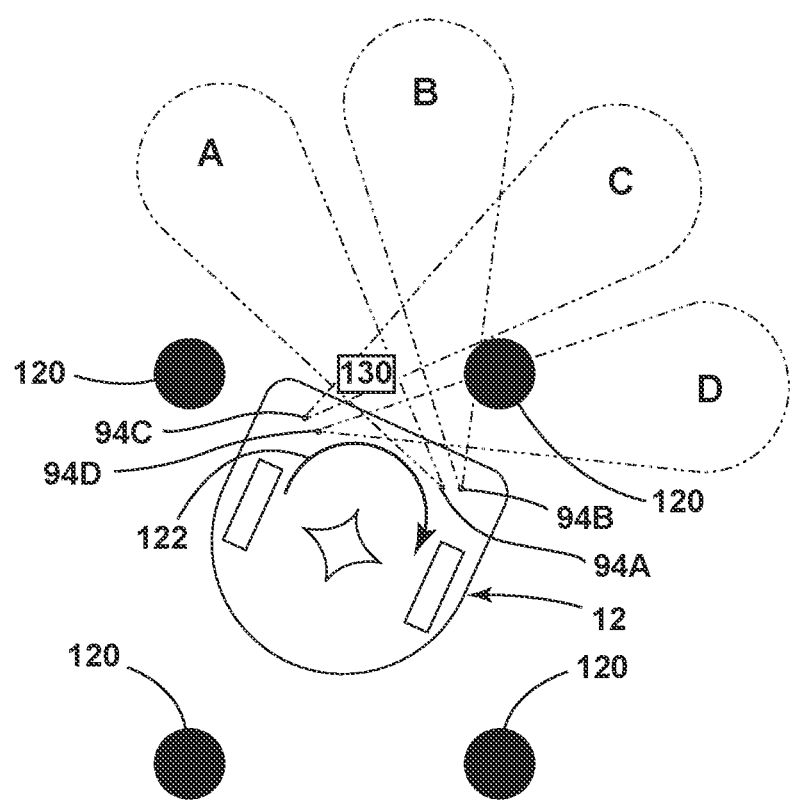
Figure 9:
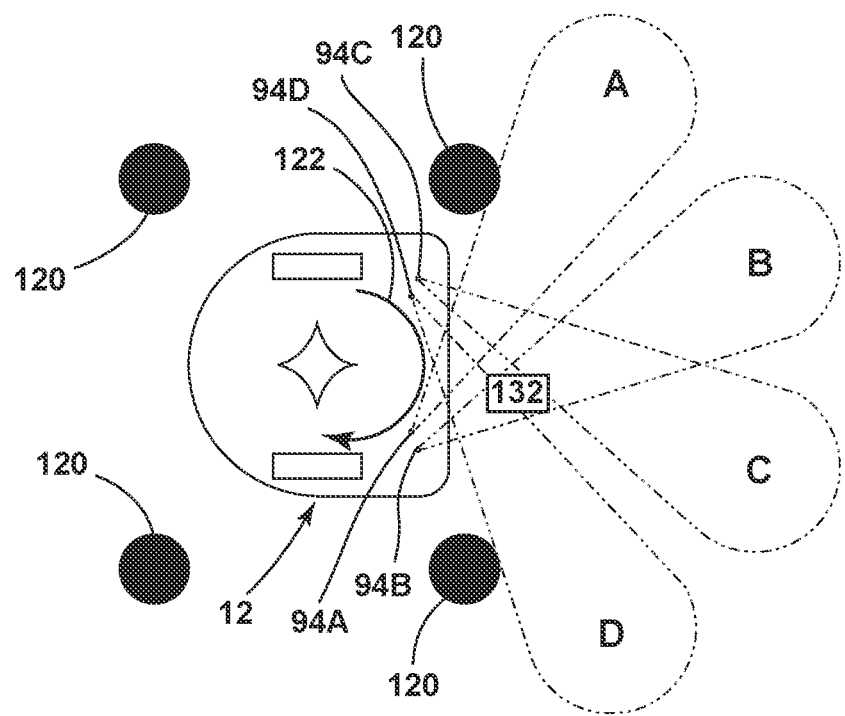

Referring to FIGS. 8-9, as the robot 12 continues to turn, obstacles may be detected in different zones. FIG. 8 shows a position where an obstacle 120 is detected in each of the zones B, C, and D, causing distance readings to be reported by the corresponding sensors 94B, 94C, 94D. No obstacle is detected in zone A. Therefore, sensor readings show an open area 130 for zone A, between the two obstacles 120, at the robot's current position or heading. FIG. 9 shows a position where an obstacle 120 is detected in the zone A, causing distance readings to be reported by the corresponding sensor 94A. No obstacle is detected in zones B, C, or D. Therefore, sensor readings show an open area 132 for zones B, C, or D,
at the robot's current position or heading. The open area 132 wide enough for the robot 12 to drive through, so can be identified an occupiable space. By driving forward on this heading, the robot 12 can exit the trapped condition.

The robot 12 can determine a heading for exiting the trapped condition using one of multiple methods. For example, with reference to FIG. 9, after identifying an open area wide enough for the robot 12 to drive through, i.e. occupiable space, the robot 12 can continue the zero-radius turn to find all occupiable space in proximity to the robot 12 before determining which heading to exit on, or the robot 12 can opt-out early and exit on this heading without completing the zero-radius turn.

In embodiments where the robot 12 completes the zero-radius turn to find all occupiable space in proximity to the robot 12, the robot 12 can determine a best heading to exit on by selecting the widest open area. For example, the controller 30 can track a global best heading, where the first time a new opening is detected, if it is the widest opening that has been detected during the turn so far, the heading on which the new, widest opening was detected is saved as the global best heading. As the robot continues to rotate, any openings of equal or less width get ignored. This can cause the robot 12 to head out on headings that are may be very near to obstacles, and not necessarily centered between two obstacles, but that are wide enough to maneuver through successfully.

In another embodiment, the robot 12 can build a profile of the open areas, and select a heading that centers the robot 12 between obstructed areas. This can increase the chance of successfully exiting the trapped condition, as there is likely more space between the robot 12 and obstacles during the exit.

In another embodiment, the robot 12 can opt-out early if the robot 12 finds an acceptably large opening during the zero-radius turn. If that threshold is not met, the robot 12 can complete the zero-radius turn and exit on the next best heading.

Regardless of how a heading is selected, once a heading is determine, the controller 30 repositions the robot 12 for travel on the heading, i.e. through the occupiable space, to exit the trapped condition.

Figure 10:
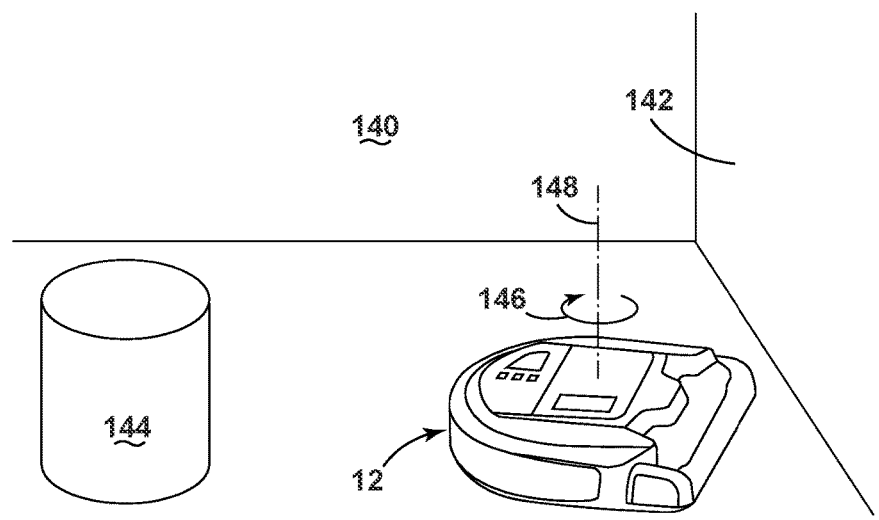
FIG. 10 is a schematic view showing a robot within a room and depicting a method of obstacle avoidance and/or cleaning path planning, according to another embodiment of the invention.

Additionally or alternatively, the robot can use a similar method to avoid obstacles and/or plan a cleaning path. FIG. 10 a schematic view showing the robot 12 within a room 140 including at least one wall 142 and at least one obstacle 144. To avoid the wall 142 or obstacle 144, or to plan a cleaning path within the room 140, according to one method, the robot 12 can perform a zero-radius turn as indicated by arrow 146 while taking readings with the distance sensors 94 (FIG. 1). Performing the zero-radius turn can comprise rotating a predetermined angle, such as rotating 360 degrees, in a clockwise or counterclockwise direction, about a center point, which can lie along a center axis 148 of the robot 12.

Figure 11:
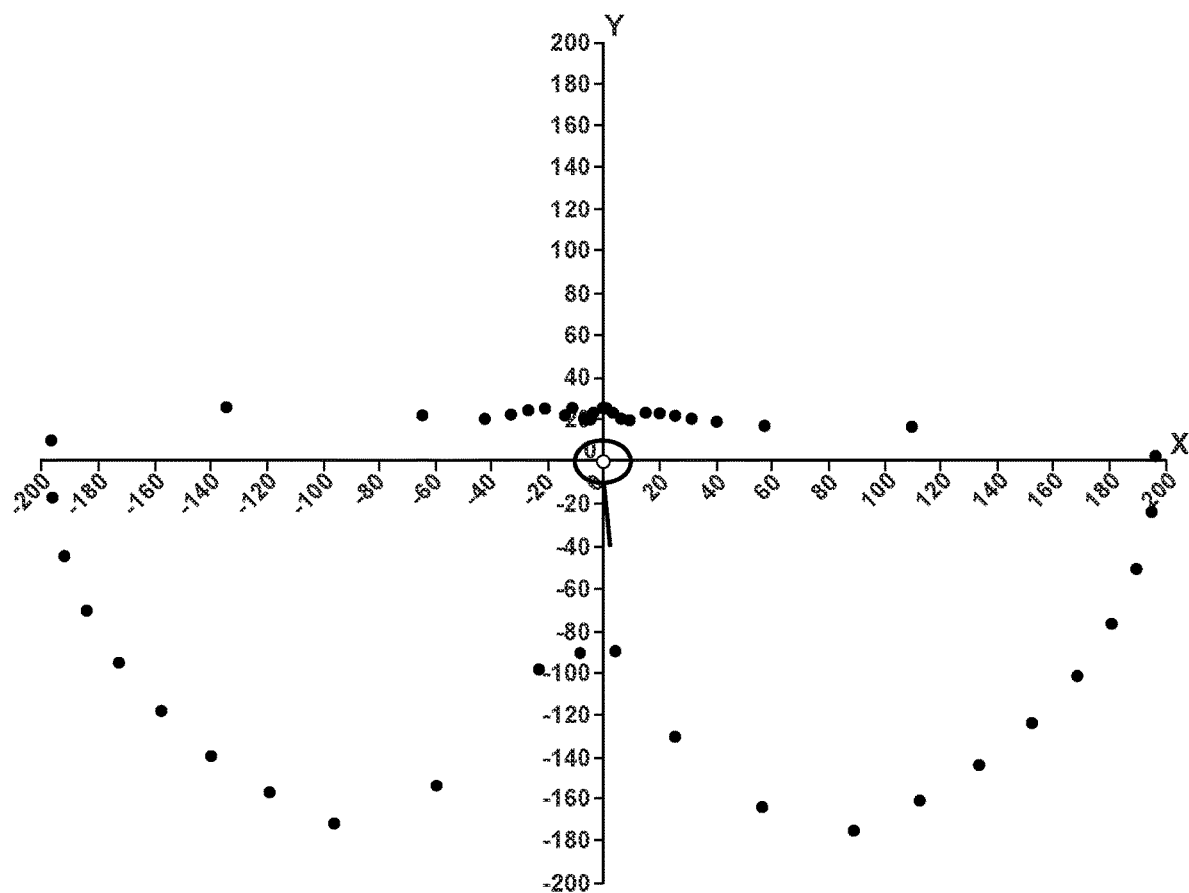
FIG. 11 is a coordinate grid plot of objects detected in proximity to robot's position shown in FIG. 10.

In one embodiment, the robot 12 is configured and operative to create a grid plot of the working area in proximity to the robot's current location, e.g., room 140. For example, FIG. 11 illustrates an exemplary grid plot for the robot's current position in the room 140 shown in FIG. 10. The position of each object in proximity to the robot 12 is identified in terms of x-y coordinates referenced to the robot 12 at the origin (0, 0). For example, the wall 142 is indicated by the straight line of coordinate points plotted to the front of the robot 12 and the obstacle 144 is indicated by the curving line of coordinate points plotted to the rear of the robot 12. Open areas are also identified in terms of the absence of coordinate points in proximity to the origin.

The robot 12 can determine a heading for avoiding obstacles or a cleaning path based on the grid plot. For example, the grid plot can be used to find one or more open areas wide enough for the robot 12 to drive through, i.e. occupiable space. The robot 12 can determine a best heading by selecting the widest open area, or by selecting an open area that meets a predetermined threshold value, or selecting a heading that centers the robot between objects.

Figure 12:
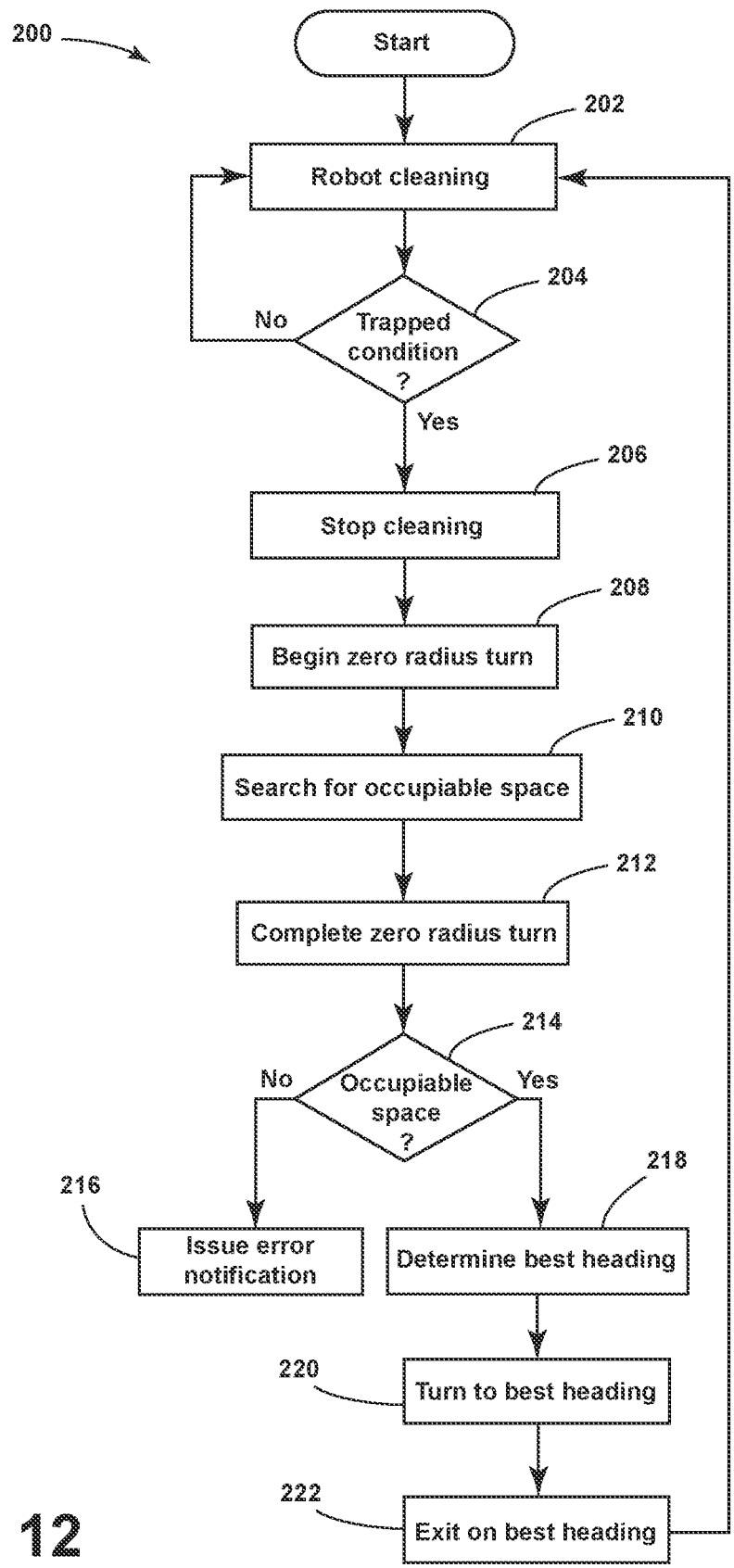
FIG. 12 is a flow chart showing one embodiment of a method for exiting a trapped condition performed by a robot.

FIG. 12 is a flow chart showing one embodiment of a method 200 for exiting a trapped condition performed by the robot 12. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

At step 202, the robot 12 is cleaning During cleaning, the vacuum motor 50 and/or brush motor 60 may be activated.

At step 204, the robot 12 checks if it is trapped. A trapped condition can be a condition where the robot 12 is trapped within a small area due to obstacle density, size, and orientation with regards to each other. Examples of small areas in which the robot 12 may become trapped include under tables, between chair legs, or in corners of rooms where furniture, side tables, etc. are pushed up against the walls.

In one embodiment, the robot 12 can determine that it is trapped based on the detection of a predetermined number of obstacles within a predetermined period of time (e.g., at least five obstacles within a period of three seconds). Input from one or more of the distance sensors 94, bump sensors 102, wall following sensor 104, cliff sensors 106, and/or IMU 108 can be used by the controller 30 to determine that the robot 12 is in a trapped condition. Optionally, while the robot 12 performs a cleaning operation, the controller 30 continuously or intermittently monitors data from sensors to determine whether sensor data indicates that the robot 12 is in a trapped condition.

If affirmative, the controller 30 registers that the robot 12 is in a trapped condition, the robot 12 can stop cleaning at step 206, and the robot 12 can begin searching for occupiable space. Stopping cleaning may include turning off the vacuum motor 50 and/or the brush motor 60. Alternatively, rather than stopping cleaning when in a trapped condition, the robot 12 may continue cleaning while searching for occupiable space.

To locate occupiable space, in one embodiment the robot 12 can perform a zero-radius turn at step 208. A zero-radius turn can be performed by operating one drive wheel 64 (FIG. 2) in the forward direction and the other drive wheel 64 in the reverse direction. The robot 12 may turn clockwise or counterclockwise. Performing the zero-radius turn can comprise rotating a predetermined angle, such as rotating 360 degrees.

During the zero-radius turn, the robot 12 can search for occupiable space at step 210. While turning, data from the distance sensors 94 can be used to track where openings are located around the robot 12, as described previously. Optionally, the robot 12 can build a grid plot similar to the example shown in FIG. 11.

At step 212, the robot 12 completes the zero-radius turn. A complete zero-radius turn can comprise a 360 degree turn of the robot 12. Alternatively, the robot 12 can rotate less than 360 degrees and complete the zero-radius turn at step 212.

Once the robot 12 completes the zero-radius turn, the robot 12 can determine whether there is occupiable space in proximity to the robot 12 at step 214. In some cases, no occupiable space may be found. If so, the method 200 proceeds to step 216 and the robot 12 issues an error notification informing the user that the robot 12 is trapped. The error notification can be a visual notification on the display 86 or elsewhere on the robot 12, or an audible notification issued from the robot 12. Additionally or alternatively, an error notification can be provided by the smart device application for the robot 12.

If there is occupiable space in proximity to the robot 12, the method 200 proceeds to step 218 where the controller 30 determines a best heading for exiting the trapped condition. The best heading to exit the trapped condition can be a heading on which the robot 12 can drive through an occupiable space. In one embodiment, the best heading can be a position that the robot 12 rotates to in which the robot 12 can drive forwardly a predetermined distance without running into an obstacle. The predetermined distance may be dependent on the range of the distance sensors 94, as obstacles outside the range of the sensors 94 are not taken into account when detecting occupiable space.

After the best heading to exit the trapped condition is determined at step 218, the robot 12 can turn to the best heading at step 220. The robot 12 can perform a zero-radius turn on the spot at step 220. The robot 12 can turn in a clockwise or counterclockwise direction to the best heading, and the direction can be determined depending on the shortest turn to the best heading, which conserves battery life and saves time. Once at the best heading, the robot 12 stops turning.

Next, the robot 12 can exit on the best heading at step 222. The robot 12 can drive forward on the best heading to exit the trapped condition, such as by operating both drive wheels 64 in the forward direction. After exiting on the best heading, i.e. once the robot 12 is no longer trapped, the method 200 can return to step 202 and the robot 12 can resume cleaning.

Figure 13:
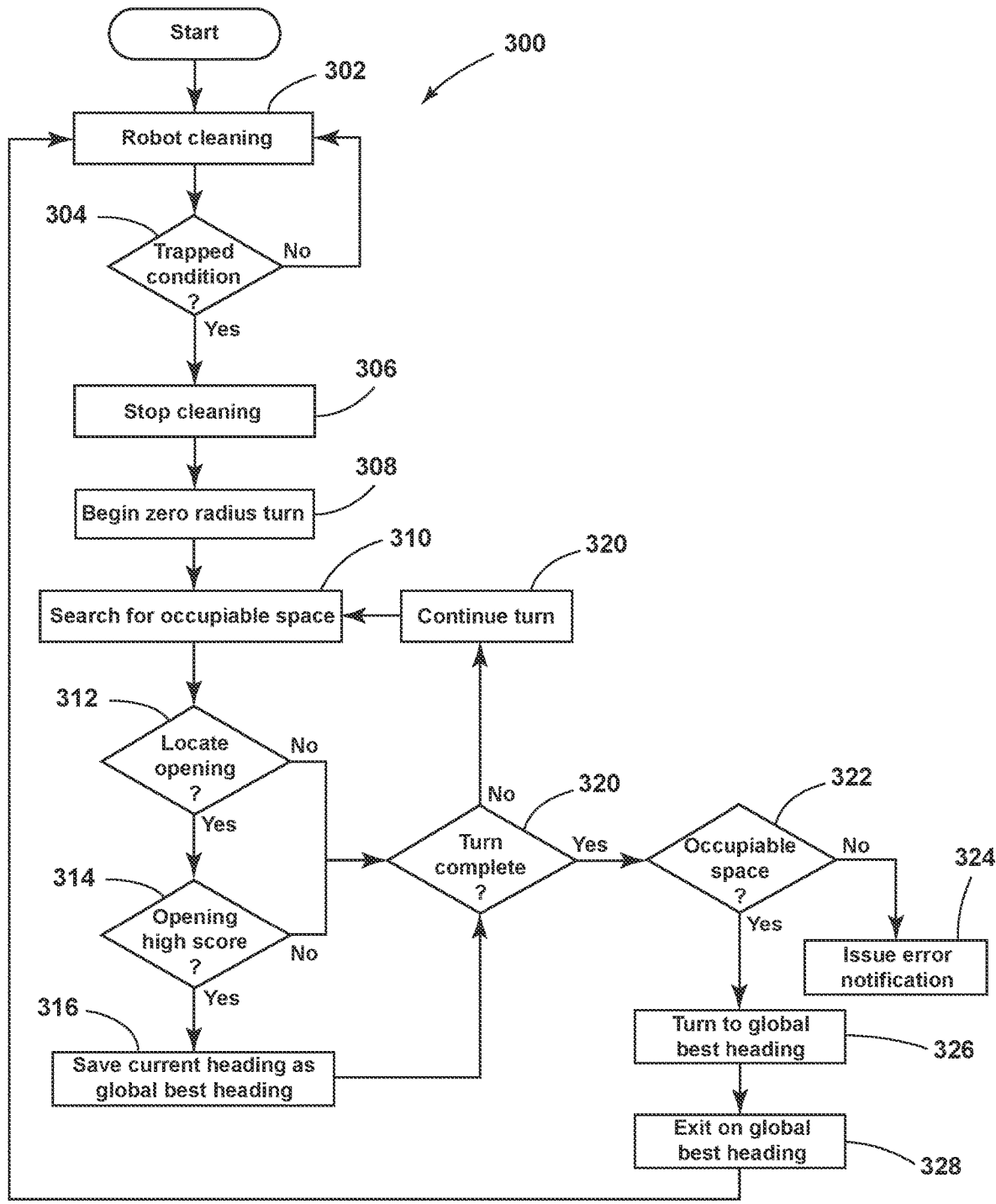
FIG. 13 is a flow chart showing another embodiment of a method for exiting a trapped condition performed by a robot.

FIG. 13 is a flow chart showing another embodiment of a method 300 for exiting a trapped condition performed by the robot 12. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

Initially, the method 300 may proceed as described previously for the first method 200, with steps 302-310oc being similar or identical to steps 202-210 of the first method 200. While performing the zero-radius turn and searching for occupiable space, data from the distance sensors 94 can be used to track where openings are located around the robot 12, as described previously. When an opening is located at step 312, the controller 30 can access the opening by assigning it a score. The score can be based on the width of the opening, with wider openings being assigned higher scores. At step 314, it is determined whether an opening located at step 312 has been assigned a high score, i.e. the highest score assigned to an opening during the zero-radius turn so far. For example, the opening's score can be compared to all other scores from the zero-radius turn. If it has the highest score (e.g. if it is the widest opening that has been detected during the turn so far) the heading on which the new opening was detected is saved as a global best heading at step 316.

After saving the global best heading at step 316, or if the opening high score is not met, or if no openings are located at step 312, the robot 12 will check if the turn is complete at step 318, and if not, will continue the turn at step 320 while continuing to search for occupiable space.

Once the robot 12 completes the zero-radius turn, the method 300 proceeds to step 322, and the robot 12 can determine whether there is occupiable space in proximity to the robot 12. In one embodiment, the robot 12 can determine whether the opening high score is a value indicating that the corresponding opening is large enough for the robot 12 to drive through.

In some cases, no occupiable space may be found. If so, the method 300 proceeds to step 324 and the robot 12 issues an error notification informing the user that the robot 12 is trapped. The error notification can be a visual notification on the display 86 or elsewhere on the robot 12, or an audible notification issued from the robot 12. Additionally or alternatively, an error notification can be provided by the smart device application for the robot 12.

If there is occupiable space in proximity to the robot 12, the robot 12 can turn to the saved global best heading at step 326. The robot 12 can perform a zero-radius turn on the spot at step 326. The robot 12 can turn in a clockwise or counterclockwise direction to the global best heading, and the direction can be determined depending on the shortest turn to the global best heading, which conserves battery life and saves time. Once at the global best heading, the robot 12 stops turning.

Next, the robot 12 can exit on the global best heading at step 328. The robot 12 can drive forward on the global best heading to exit the trapped condition, such as by operating both drive wheels 64 in the forward direction. After exiting on the global best heading, i.e. once the robot 12 is no longer trapped, the method 300 can return to step 302 and the robot 12 can resume cleaning.

Figure 14:
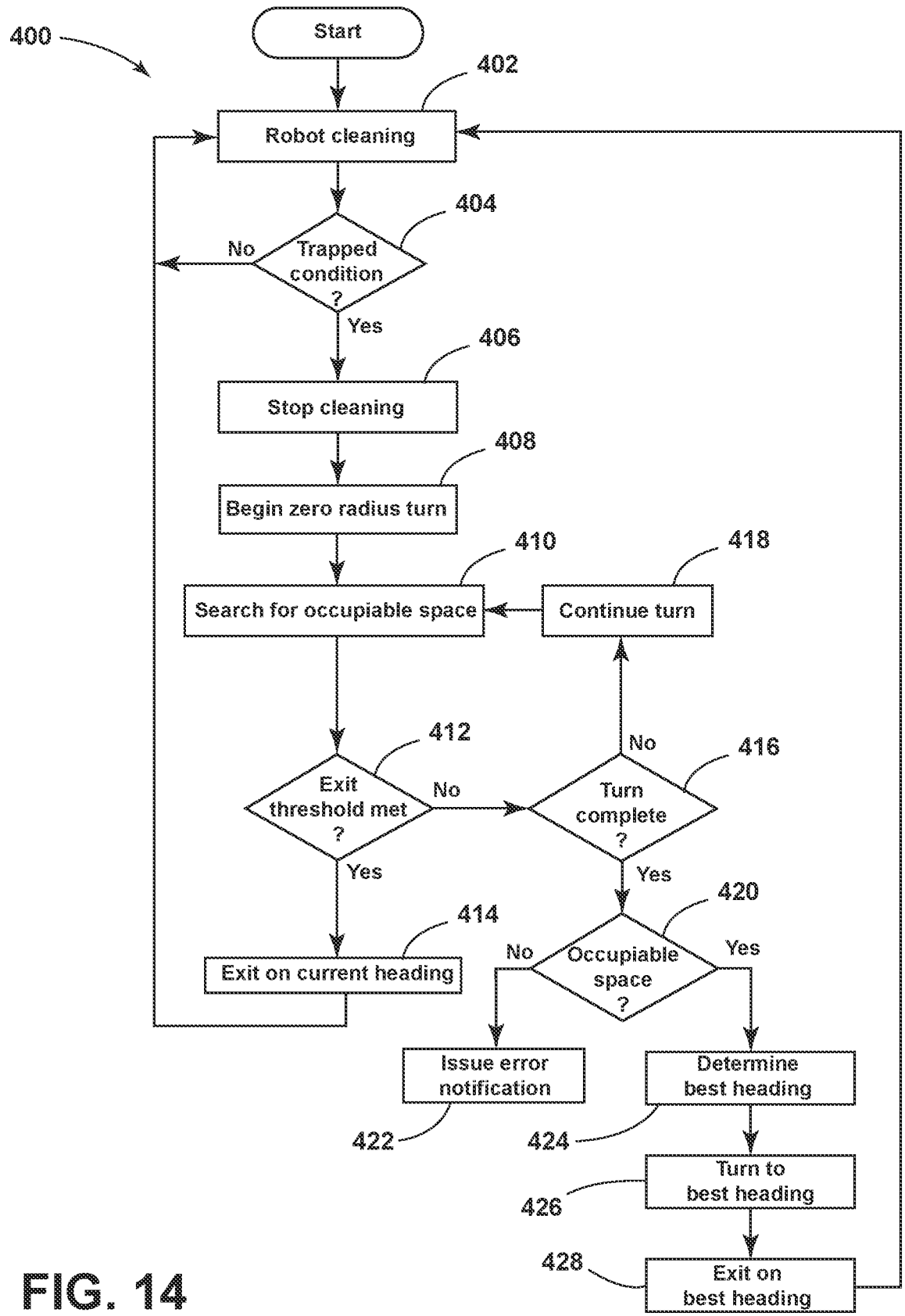
FIG. 14 is a flow chart showing yet another embodiment of a method for exiting a trapped condition performed by a robot.

FIG. 14 is a flow chart showing yet another embodiment of a method 400 for exiting a trapped condition performed by the robot 12. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

Initially, the method 400 may proceed as described previously for the first method 200, with steps 402-410 being similar or identical to steps 202-210 of the first method 200. While performing the zero-radius turn and searching for occupiable space, the controller 30 can determine if an exit threshold is met at step 412. The exit threshold can be a heading estimated or assumed to get the robot 12 out of the trapped condition with a high degree of reliability. In one embodiment, to meet the exit threshold, the robot 12 must have detected an opening meeting or exceeding an exit threshold size and have rotated at least a minimum exit angle (e.g. at least 45 degrees). In one embodiment, the exit threshold size can be 950 mm.

If the exit threshold is met during the zero-radius turn, the robot 12 can exit on its current heading at step 414. When the exit threshold is met, the robot 12 can stop turning on the spot, leaving the robot 12 at a current heading that is estimated/assumed to get the robot 12 out of the trapped condition. The robot 12 can drive forward on the current heading to exit the trapped condition, such as by operating both drive wheels 64 in the forward direction. After exiting on the current heading, i.e. once the robot 12 is no longer trapped, the method 400 can return to step 402 and the robot 12 can resume cleaning.

If the exit threshold is not met, the robot 12 will check if the turn is complete at step 416, and if not, will continue the turn at step 418 while continuing to search for occupiable space. If the robot 12 completes the zero-radius turn without detecting any openings that meet the exit threshold, the method 400 proceeds to step 420, and the robot 12 can determine whether there is occupiable space in proximity to the robot 12. In some cases, no occupiable space may be found. If so, the method 400 proceeds to step 422 and the robot 12 issues an error notification informing the user that the robot 12 is trapped. The error notification can be a visual notification on the display 86 or elsewhere on the robot 12, or an audible notification issued from the robot 12. Additionally or alternatively, an error notification can be provided by the smart device application for the robot 12.

If there is occupiable space in proximity to the robot 12, the method proceeds through steps 424-428, which can be similar or identical to steps 218-222 of the first method 200, and in which the robot 12 determines a best heading, turns to the best heading, and exits the trapped condition on the best heading. After exiting on the best heading, i.e. once the robot 12 is no longer trapped, the method 400 can return to step 402 and the robot 12 can resume cleaning.

Figure 15:
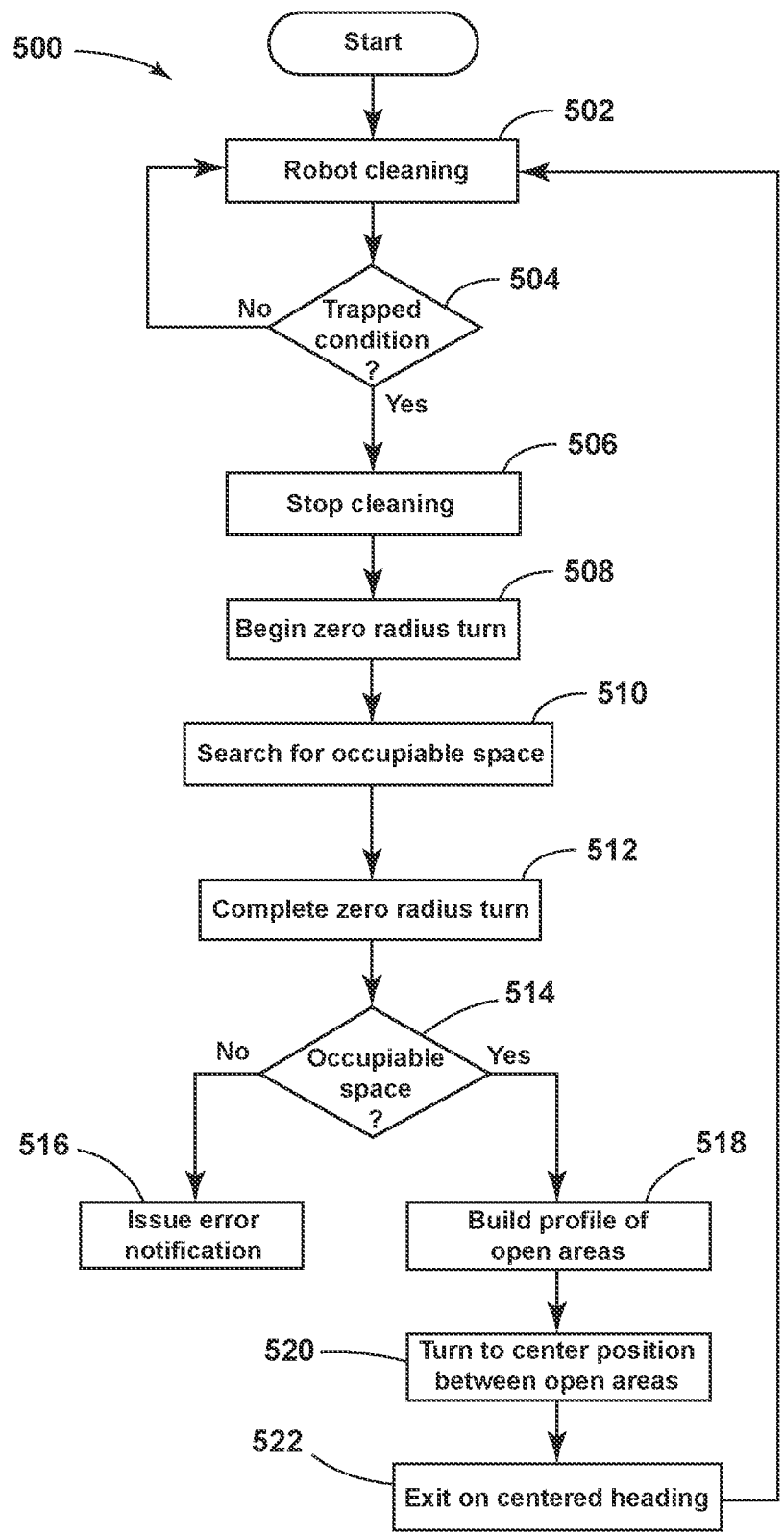
FIG. 15 is a flow chart showing still another embodiment of a method for exiting a trapped condition performed by a robot.

FIG. 15 is a flow chart showing still another embodiment of a method 500 for exiting a trapped condition performed by the robot 12. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

Initially, the method 500 may proceed as described previously for the first method 200, with steps 502-516 being similar or identical to steps 202-216 of the first method 200. If, after performing the zero-radius turn and searching for occupiable space, there is occupiable space in proximity to the robot 12, the method proceeds to step 518 and the controller 30 builds a profile of open areas around the robot 12. The profile can be based on sensor readings from the zero-radius turn. Optionally, the profile can be a grid plot similar to the example shown in FIG. 11.

After the profile is built at step 518, the robot 12 can select the largest open area indicated by the profile, determine a heading on which the robot will be centered within the largest open area, and turn to the heading step 520. Such a heading can give the robot 12 the best odds of successfully exiting the trapped condition. The robot 12 can perform a zero-radius turn on the spot at step 520. The robot 12 can turn in a clockwise or counterclockwise direction to the center position heading, and the direction can be determined depending on the shortest turn to the center position heading, which conserves battery life and saves time. Once at the center position heading, the robot 12 stops turning.

Next, the robot 12 can exit on the center position heading at step 522. The robot 12 can drive forward on the center position heading to exit the trapped condition, such as by operating both drive wheels 64 in the forward direction. After exiting on the center position heading, i.e. once the robot 12 is no longer trapped, the method 500 can return to step 502 and the robot 12 can resume cleaning.

Figure 16:
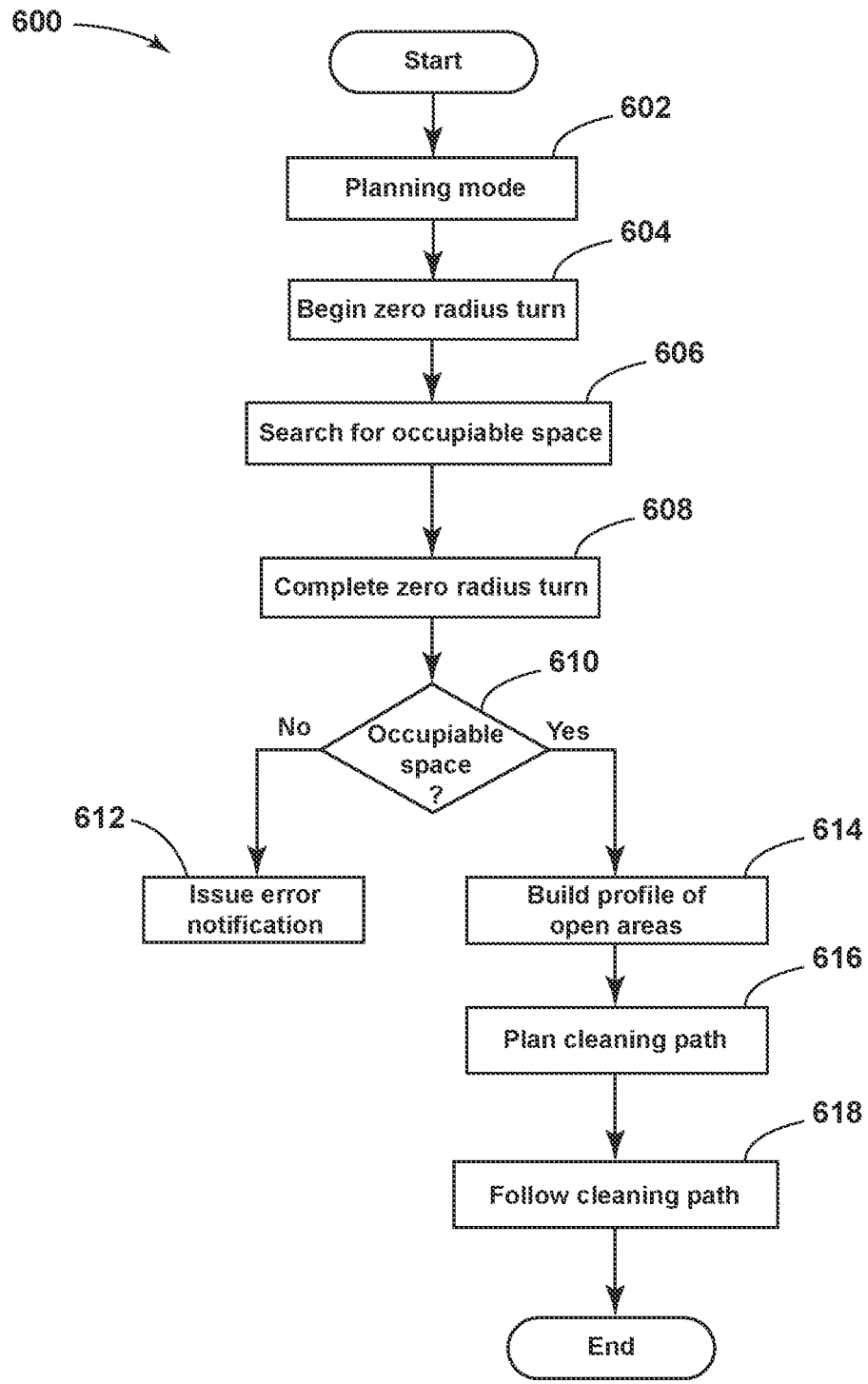
FIG. 16 is a flow chart showing one embodiment of a method for planning a cleaning path performed by a robot.

FIG. 16 is a flow chart showing one embodiment of a method 600 for cleaning path planning performed by the robot 12. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

At step 602, the robot 12 enters a planning mode. The robot 12 can enter the planning mode when a user has command the robot 12 to perform a cleaning cycle of operation (e.g. pressed a "clean" or "start" button on the robot 12 or on a mobile device). Prior to actually beginning the cleaning operation, the robot 12 can plan a cleaning path using the method 600. Additionally or alternatively, the robot 12 can enter the planning mode mid-cleaning cycle.

The method 600 may proceed through steps 604-612 as described for the previous method 500, with steps 604-612 being similar or identical to steps 508-516 of the previous method 500. If, after performing the zero-radius turn and searching for occupiable space, there is occupiable space in proximity to the robot 12, the method proceeds to step 614 and the controller 30 builds a profile of open areas around the robot 12. The profile can be based on sensor readings from the zero-radius turn. Optionally, the profile can be a grid plot similar to the example shown in FIG. 11.

After the profile is built at step 614, the robot 12 can plan a cleaning path based on the profile at step 616. The planned cleaning path can be a path that can give the robot 12 the best odds of successfully cleaning the most floor area while conserving battery life and/or other on-board resources such as cleaning solution. The cleaning path can include one or more rotation instructions, such as what direction to rotate the robot 12 (e.g. left or right) and the number of degrees to rotate. The cleaning path can additionally or alternatively include one or more translation instructions, such as how far to drive the robot 12 in reverse or how far to drive the robot 12 forward.

Next, the robot 12 can following the planned cleaning path at step 618. The robot 12 can operate the drive wheels 64 as needed to execute the rotation and/or translation instructions planned at step 616. While following the cleaning path, the robot 12 can be cleaning the floor surface over which it moves. Accordingly, the vacuum motor 50 and/or brush motor 60 can be activated as needed.

Figure 17:
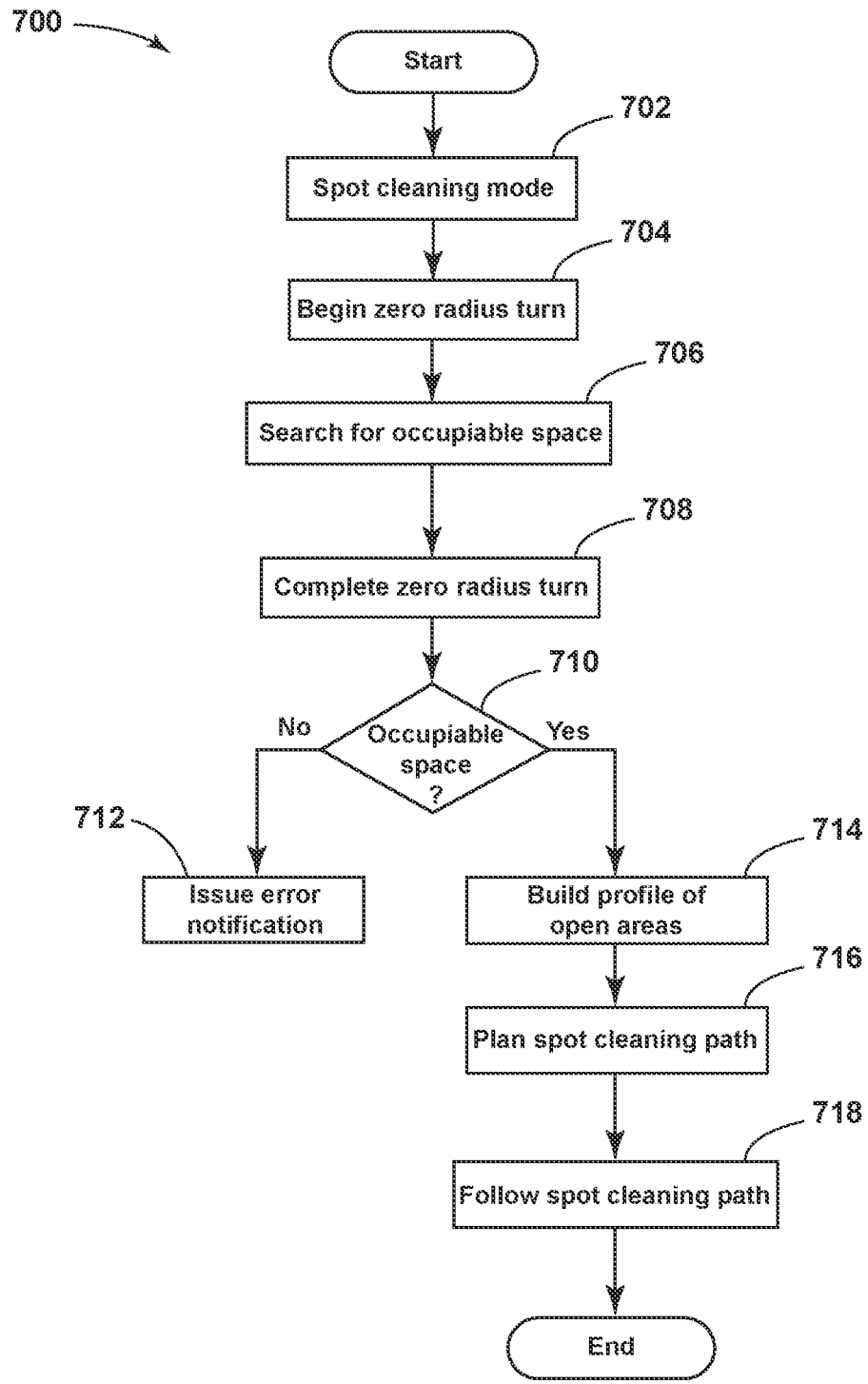
FIG. 17 is a flow chart showing one embodiment of a method for planning a spot cleaning path performed by a robot.

FIG. 17 is a flow chart showing one embodiment of a method 700 for spot cleaning performed by the robot 12. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

The method 700 may proceed through steps 702-718 as described previously for the cleaning path planning method 600, with steps 702-718 being similar or identical to steps 602-618 of the previous method 600. For example at step 702, the robot 12 can enter a planning mode when a user has command the robot 12 to perform a spot cleaning cycle of operation (e.g. pressed a "spot clean" or "start" button on the robot 12 or on a mobile device). Additionally or alternatively, the robot 12 can autonomous enter the spot cleaning mode based on sensor data, such as input from the floor condition sensor 114.

When the robot is in a spot cleaning mode, the robot 12 focuses on a small area in proximity to the robot 12. This is different from random cleaning, where the area to be cleaned is implicitly unbounded and unknown. To stay within a small area, autonomous floor cleaners have traditionally done some semblance of path following. However, if obstacles appear in the path, the robot is required to make complicated decisions to try to maintain the path or otherwise remain in the small area. Applying the method 700, which begins with a search for occupiable space, allows the robot 12 to build a profile of opening within the small area, and plan ahead for areas that may be difficult or impossible to clean within the small area.

After the profile is built at step 714, the robot 12 can plan a spot cleaning path based on the profile at step 716. The planned spot cleaning path can be a path that can give the robot 12 the best odds of successfully cleaning the most floor area while conserving battery life and/or other on-board resources such as cleaning solution.

Next, the robot 12 can following the planned spot cleaning path at step 718. While following the spot cleaning path, the robot 12 can be spot cleaning the floor surface over which it moves. For spot cleaning, components of a fluid delivery system and/or a fluid recovery system can be activated as needed.

Figure 18:
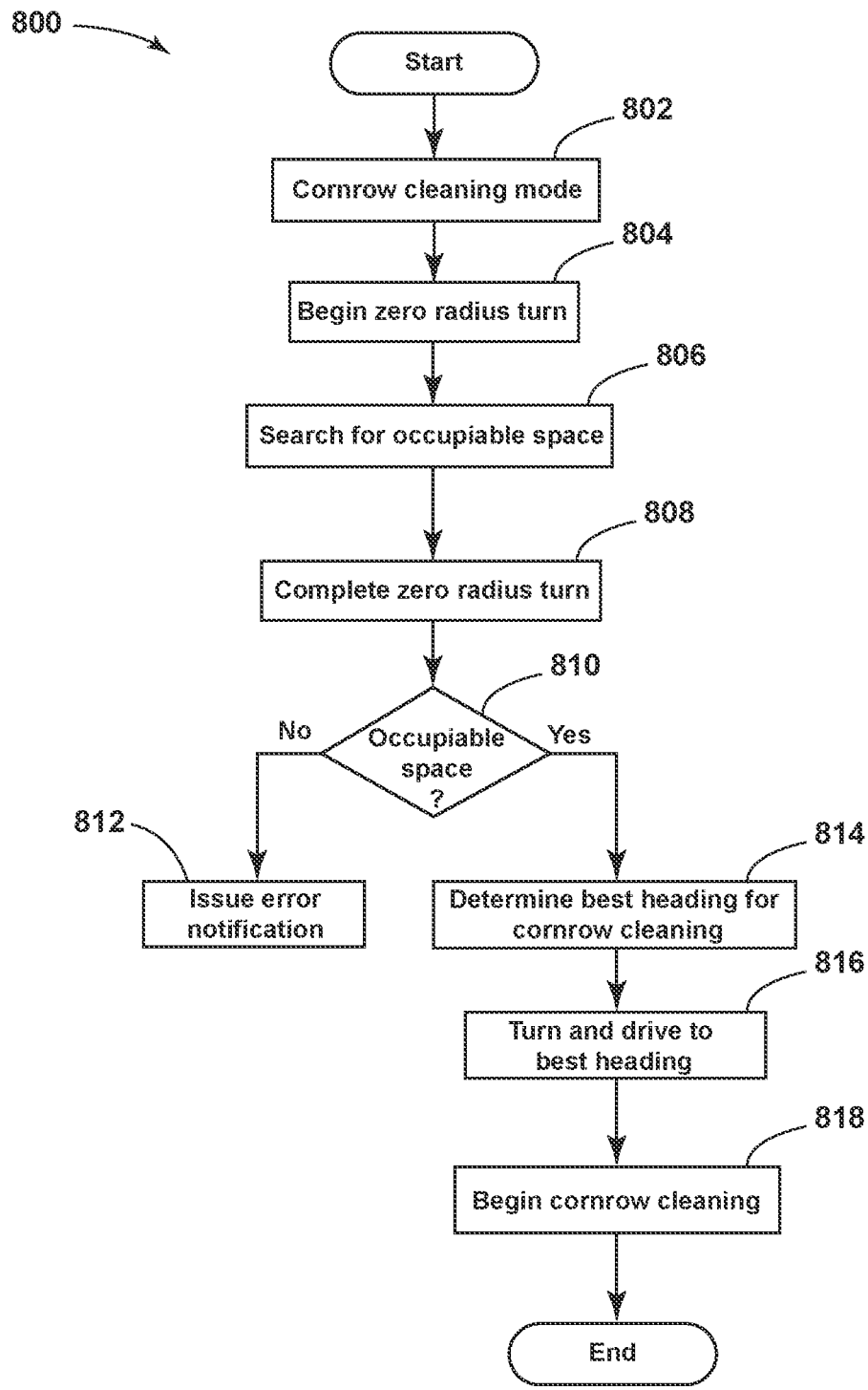
FIG. 18 is a flow chart showing one embodiment of a method for planning a cornrow cleaning path performed by a robot.

FIG. 18 is a flow chart showing one embodiment of a method 800 for cornrow cleaning performed by the robot 12. The sequence of steps discussed is for illustrative purposes only and is not meant to limit the method in any way as it is understood that the steps may proceed in a different logical order, additional or intervening steps may be included, or described steps may be divided into multiple steps, without detracting from the invention.

The method 800 may proceed through steps 802-812 as described previously for the cleaning path planning method 600, with steps 702-812 being similar or identical to steps 602-612 of the previous method 600. For example at step 802, the robot 12 can enter a planning mode before the robot 12 executes a cornrow cleaning behavior.

When the robot performs cornrow cleaning, the robot 12 can travel in a cornrow pattern, e.g. boustrophedon or alternating rows (that is, the robot 12 travels from right-to-left and left-to-right on alternate rows). The method 800 can be used to pick a heading for beginning the cornrow cleaning path. Applying the method 800, which begins with a search for occupiable space, allows the robot 12 to build a profile of openings, and plan an optimal location to initiate the cornrow pattern. For example, a corner or a wall may be an optimal location to initiate the cornrow pattern. If there is a corner or a wall in proximity to the robot 12, the corner or wall can be identified in the search for occupiable space.

As long as there is occupiable space in proximity to the robot 12, at step 814 the controller 30 determines a best heading for cornrow cleaning. The best heading for cornrow cleaning can be a heading on which the robot 12 can drive to reach a starting location for cornrow cleaning, from which the robot 12 can then begin to travel in the cornrow pattern. In one embodiment, the best heading can be a position that the robot 12 rotates to in which the robot 12 can drive forwardly to a wall or corner without running into an obstacle.

After the best heading for cornrow cleaning is determined at step 814, the robot 12 can turn to the best heading and drive to the best heading at step 816. The robot 12 can perform a zero-radius turn on the spot at step 816. The robot 12 can turn in a clockwise or counterclockwise direction to the best heading, and the direction can be determined depending on the shortest turn to the best heading, which conserves battery life and saves time. Next, the robot 12 can drive forward on the best heading to reach the starting location for cornrow cleaning, such as by operating both drive wheels 64 in the forward direction. After reaching the starting location, the robot 12 can begin cornrow cleaning at step 818.

There are several advantages of the present disclosure arising from the various aspects or features of the apparatus, systems, and methods described herein. For example, aspects described above provide embodiments of methods for exiting trapped conditions performed by an autonomous or robotic vacuum cleaner. Using the methods disclosed herein, the robot 12 can avoid getting stuck in trapped conditions, smartly navigating around obstacles and operating efficiently to clean a desired flor area while conserving battery life.

Another advantage of aspects of the disclosure relates to obstacle avoidance. Aspects described above provide embodiments of methods for avoiding obstacles performed by an autonomous or robotic vacuum cleaner. Using the methods disclosed herein, the robot 12 may avoid getting into a trapped condition, smartly navigating around obstacles efficiently to conserve battery life.

Yet another advantage of aspects of the disclosure is relates to path planning. Aspects described above provide embodiments of methods for planning a cleaning path performed by an autonomous or robotic vacuum cleaner. Using the methods disclosed herein, the robot 12 may avoid getting into a trapped condition, smartly navigating through the planned cleaning path to clean the floor area efficiently while conserving battery life and on-board resources such as cleaning solution.

To the extent not already described, the different features and structures of the various embodiments of the invention, may be used in combination with each other as desired, or may be used separately. That one autonomous floor cleaner or floor cleaning robot is illustrated herein as having all of these features does not mean that all of these features must be used in combination, but rather done so here for brevity of description. It is noted that while the methods 200, 300, 400, 500, 600, 700, 800 are described with respect to the embodiment of the robot 12 shown herein, the methods 200, 300, 400, 500, 600, 700, 800 can also be applied to other robots. Further, while multiple methods are disclosed herein, one of the disclosed methods may be performed independently, or more than one of the disclosed methods, including any combination of methods disclosed herein may be performed by one robot. Thus, the various features of the different embodiments may be mixed and matched in various cleaning apparatus configurations as desired to form new embodiments, whether or not the new embodiments are expressly described.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular components or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

What is claimed is:

1. An autonomous floor cleaner comprising:
an autonomously moveable housing,
a drive system for autonomously moving the housing over a surface to be cleaned,
a controller for controlling the operation of the autonomous floor cleaner, and
a plurality of occupiable space sensors having overlapping sensing zones and configured to detect open areas around the autonomous floor cleaner and provide this information as input to the controller;
wherein the controller configured to:
  drive the autonomous floor cleaner in a zero-radius turn;
  search for open areas around the autonomous floor cleaner by analyzing input from the plurality of occupiable space sensors to identify the presence of an open area that meets a predetermined exit threshold and the presence of at least one area of occupiable space around the autonomous floor cleaner, wherein the at least one area of occupiable space comprises an open area large enough to drive the autonomous floor cleaner through;
  in response to an identification of an open area that meets the predetermined exit threshold while searching for open areas:
    stop driving the autonomous floor cleaner in the zero-radius turn prior to completion of a 360 degree zero-radius turn; and
    operate the drive system to drive the autonomous floor cleaner forwardly on a current heading of the autonomous floor cleaner; and
  in response to completing at least a 360 degree zero-radius turn without an identification of an open area that meets the predetermined exit threshold while searching for open areas:
    select a best heading for the autonomous floor cleaner based on an identification of at least one area of occupiable space around the autonomous floor cleaner during the zero-radius turn; and
    operate the drive system to drive the autonomous floor cleaner forwardly on the best heading.

2. The autonomous floor cleaner of claim 1, wherein the plurality of occupiable space sensors comprise distance sensors configured to detect objects in front of and to the sides of the housing.

3. The autonomous floor cleaner of claim 2, wherein the distance sensors are one of infrared sensors and time-of-flight (TOF) sensors.

4. The autonomous floor cleaner of claim 1, wherein the housing is D-shaped, and comprises a straight front end and a rounded rear end, wherein the front end defines a widest dimension of the floor cleaner orthogonal to a direction of forward movement of the floor cleaner, wherein the area of occupiable space is a space that is larger than the widest dimension of the floor cleaner.

5. The autonomous floor cleaner of claim 4, wherein the plurality of occupiable space sensors are disposed adjacent the front end of the housing, and oriented at varying angles to provide a total field of view that extends across the entire front end of the housing, and widens outwardly in a direction away from the front end of the housing.

6. The autonomous floor cleaner of claim 1, wherein the controller is configured to detect that the autonomous floor cleaner is a trapped condition, and initiate the zero-radius turn upon detecting that the autonomous floor cleaner is a trapped condition.

7. The autonomous floor cleaner of claim 1, wherein the controller is configured to
select the best heading by selecting a widest open area of occupiable space determined during the zero-radius turn.

8. The autonomous floor cleaner of claim 1, wherein detecting an open area that meets a predetermined exit threshold comprises detecting an open area of at least a predetermined threshold size.

9. The autonomous floor cleaner of claim 8, wherein the predetermined exit threshold comprises the autonomous floor cleaner having rotated at least a predetermined minimum angle during the zero-radius turn.

10. The autonomous floor cleaner of claim 1, comprising:
a vacuum collection system comprising a working air path through the housing having an air inlet and an air outlet, a suction nozzle defining the air inlet, a suction source comprising a vacuum motor in fluid communication with the suction nozzle, and a collection bin; and
a rotatable brushroll driven by a brush motor;
wherein the controller is configured to turn off at least one of the vacuum motor and the brush motor before the zero-radius turn, and turn on at least one of the vacuum motor and the brush motor after selecting the best heading.

11. The autonomous floor cleaner of claim 1, wherein:
the drive system comprises a plurality of drive wheels, at least one wheel motor, and wheel encoders configured to measure a distance traveled by the autonomous floor cleaner and provide distance measurements as input to the controller; and
the controller is configured to:
analyze input from the wheel encoders to determine the at least one area of occupiable space around the autonomous floor cleaner as a vector relative to a pose of the autonomous floor cleaner.

12. A method for exiting a trapped condition performed by an autonomous floor cleaner during autonomous floor cleaning, the autonomous floor cleaner comprising an autonomously moveable housing, a drive system for autonomously moving the housing over a surface to be cleaned, and a controller for controlling the operation of the autonomous floor cleaner, the method comprising:
detecting that the autonomous floor cleaner is a trapped condition;
driving the autonomous floor cleaner in a zero-radius turn;
receiving, with the controller, input from a plurality of occupiable space sensors having overlapping sensing zones and configured to detect open areas around the autonomous floor cleaner;
searching for open areas around the autonomous floor cleaner by analyzing, with the controller, the input from the plurality of occupiable space sensors to identify the presence of an open area that meets a predetermined exit threshold and the presence of at least one area of occupiable space around the autonomous floor cleaner, wherein the at least one area of occupiable space comprises an open area large enough to drive the autonomous floor cleaner through;
in response to an identification of an open area that meets the predetermined exit threshold while searching for open areas:
stopping the zero-radius turn prior to completion of a 360 degree zero-radius turn; and
operating the drive system to drive the autonomous floor cleaner forwardly on a current heading; and
in response to completing at least a 360 degree zero-radius turn without an identification of an open area that meets the predetermined exit threshold while searching for open areas:
selecting a best heading for exiting the trapped condition based on an identification of at least one area of occupiable space around the autonomous floor cleaner during the zero-radius turn; and
operating the drive system to drive the autonomous floor cleaner forwardly on the best heading.

13. The method of claim 12, wherein driving the autonomous floor cleaner in the zero-radius turn comprises rotating the autonomously moveable housing at least 360 degrees about a center point of the autonomously moveable housing, the center point being aligned to a rotational axis having a fixed position during rotation of the autonomously moveable housing.

14. The method of claim 12, wherein selecting a best heading for the autonomous floor cleaner comprises at least one of:
selecting a widest open area of occupiable space determined during the zero-radius turn; and
selecting a heading that centers the autonomous floor cleaner between two obstructed areas determined during the zero-radius turn.

15. The method of claim 12, wherein the predetermined exit threshold comprises detecting an open area of at least a predetermined threshold size.

16. The method of claim 15, wherein the predetermined exit threshold comprises rotating the autonomous floor cleaner at least a predetermined minimum angle during the zero-radius turn.

17. The method of claim 12, comprising:
stopping cleaning and turning off at least one of a vacuum motor and a brush motor before the zero-radius turn; and
resuming cleaning and turning on the least one of the vacuum motor and the brush motor after selecting the best heading.

18. The method of claim 12, comprising:
analyzing, with the controller, input from wheel encoders to determine the at least one area of occupiable space around the autonomous floor cleaner as a vector relative to a pose of the autonomous floor cleaner, the wheel encoders configured to measure a distance traveled by the autonomous floor cleaner.

19. The method of claim 12, wherein operating the drive system to drive the autonomous floor cleaner forwardly on the best heading comprises:
determining a shortest turn direction to the best heading; and
turning the autonomous floor cleaner in the shortest turn direction to the best heading; and
driving the autonomous floor cleaner forwardly on the best heading.

20. The method of claim 12, wherein an identification of an open area that meets the predetermined exit threshold comprises detecting an open area of at least a minimum threshold size after having rotated at least 45 degrees in the zero-radius turn.

21. The autonomous floor cleaner of claim 1, wherein an identification of an open area that meets the predetermined exit threshold comprises detecting an open area of at least a minimum threshold size after having rotated at least 45 degrees in the zero-radius turn.

22. The autonomous floor cleaner of claim 1, wherein the controller is configured to select the best heading by selecting a heading that centers the autonomous floor cleaner between two obstructed areas determined during the zero-radius turn.

* * * * *

UNITED STATES PATENT AND TRADEMARK OFFICE
CERTIFICATE OF CORRECTION

PATENT NO. : 11,966,222 B2
APPLICATION NO. : 17/145608
DATED : April 23, 2024
INVENTOR(S) : David VanKampen et al.

It is certified that error appears in the above-identified patent and that said Letters Patent is hereby corrected as shown below:

On the Title Page

In the ABSTRACT (57), Line 3:
After "can be used" insert -- to --

In the Claims

Column 22, Claim 17, Line 39:
After "turning on the" insert -- at --

Signed and Sealed this
Twenty-first Day of May, 2024

Katherine Kelly Vidal
*Director of the United States Patent and Trademark Office*